US012196394B2

(12) United States Patent
Jeswani et al.

(10) Patent No.: US 12,196,394 B2
(45) Date of Patent: Jan. 14, 2025

(54) LUMINAIRE RETROFIT KIT

(71) Applicant: LEDVANCE LLC, Wilmington, MA (US)

(72) Inventors: Anil Jeswani, Acton, MA (US); Tianzheng Jiang, Shenzhen (CN); Ming Li, Acton, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 18/435,389

(22) Filed: Feb. 7, 2024

(65) Prior Publication Data

US 2024/0271776 A1 Aug. 15, 2024

Related U.S. Application Data

(60) Provisional application No. 63/444,438, filed on Feb. 9, 2023.

(51) Int. Cl.

*F21V 21/00* (2006.01)
*F21V 21/005* (2006.01)
*F21V 21/008* (2006.01)
*F21Y 115/10* (2016.01)

(52) U.S. Cl.

CPC .......... *F21V 21/005* (2013.01); *F21V 21/008* (2013.01); *F21Y 2115/10* (2016.08)

(58) Field of Classification Search

CPC ... F21Y 2115/10; F21V 21/005; F21V 21/008
See application file for complete search history.

(56) References Cited

U.S. PATENT DOCUMENTS 10,415,789 B2 * 9/2019 White .................... F21V 3/049
10,634,293 B1 * 4/2020 Green .................... F21V 21/03
2016/0102814 A1 * 4/2016 Green .................... F21S 4/28 362/221
2018/0306417 A1 * 10/2018 McCane ................ F21K 9/275
2019/0104585 A1 * 4/2019 Albrechtsen .......... F21V 23/007
2020/0370737 A1 * 11/2020 Yang .................... F21S 8/026

* cited by examiner

*Primary Examiner* — Gerald J Sufleta, II
(74) *Attorney, Agent, or Firm* — Harry Hild

(57) ABSTRACT

A retrofit light emitting diode structure that includes a light emitting diode (LED) panel including at least a light emitting diode (LED) light source contained within an assembly or a lens and base housing. At least one track bracket is present on at least a portion of the perimeter of the base housing. The track bracket includes an opening to a race. An assembly mechanism is fastened to the track bracket that is positioned for engagement to an opening in a housing mount for the LED panel, wherein the assembly mechanism includes a tether having a length for providing an assembly distance from the housing mount. The retrofit light emitting diode (LED) structure also includes a retaining mechanism, wherein a base of the retaining mechanism includes a profile for engagement to the race of the track bracket and retaining arms extend through the opening to the race for reversible engagement to slots in the housing mount for the LED panel.

20 Claims, 18 Drawing Sheets

205c

LUMINAIRE RETROFIT KIT

CROSS REFERENCE TO RELATED APPLICATION

This patent application is a Continuation and claims benefit and priority to provisional U.S. Patent Application 63/444,438, titled "LUMINAIRE RETROFIT KIT" filed on Feb. 9, 2023, which is herein incorporated by reference in its entirety

TECHNICAL FIELD

The present disclosure generally relates to a retrofit panel for use with existing ceiling mounted light housings. More particularly, the present invention is a retrofit LED light panel for fitment to the light housing of a fluorescent light fixture.

BACKGROUND

Fluorescent lights have been commonly and widely used, because of their energy saving features. Most fluorescent lights have a generally rectangular or square housing that can be installed in any type of ceiling with the housing recessed into the ceiling. By way of example only, such types of ceilings might include dry wall, stucco, drop panel and hard lid ceilings—to name a few. In some cases, the housing may be surface mounted on the ceiling. The ballasts and fluorescent tubes of fluorescent lights are typically spread throughout the housing with a lens secured into the opening of the housing flush with the housing or the ceiling. Because of their popularity and ease of use, fluorescent light fixtures are presently installed in countless numbers across the world.

Light emitting diodes (LED's) are oftentimes desirable to use because of their improved output, decreased energy consumption, and increased lifespan compared to other forms of light sources, including fluorescent lights. While there exists technology to replace fluorescent bulbs with LED tube bulbs, such LED tube bulbs are more expensive than fluorescent bulbs, and can be time consuming to install into existing light fixtures. Replacing fluorescent bulbs with LED tube bulbs may requires replacing the ballasts in existing fixtures if the ballast is incompatible with the LED tube. Alternatively, line voltage LED tubes (UL Type B) can be used which involves rewiring of the sockets and bypassing the existing ballasts. While such concerns exist when replacing one light fixture, such concerns are especially problematic for office or apartment buildings (and similar locations) that contain a large number of light fixtures. Upgrading and/or replacing every light fixture in such a building can very quickly become unreasonably expensive.

Recently, some manufactures have been making LED panels that are designed and constructed to wholly replace fluorescent light fixtures. These LED panels are configured to occupy the same space in the ceiling as the fluorescent light housing. In new construction, this means that the same size opening is left in a ceiling, but instead of installing a fluorescent light fixture, the builder simply installs the LED panel instead.

In contrast, retrofitting a fluorescent light fixture with an LED panel can require removing the entire fluorescent light fixture, e.g., lens, bulbs, ballasts, and housing, which are difficult and expensive to dispose of because they are considered hazardous materials. The added time and expense associated with such complete removal in the case of retrofitting can become extremely burdensome.

SUMMARY

The present disclosure provides a retrofit light emitting diode structure is provided. In one embodiment, the retrofit light emitting diode structure includes a light emitting diode (LED) panel including at least a light emitting diode (LED) light source contained within an assembly or a lens and base housing. At least one track bracket is present on at least a portion of the perimeter of the base housing. The track bracket includes an opening to a race. An assembly mechanism is fastened to the track bracket that is positioned for engagement to an opening in a housing mount for the LED panel, wherein the assembly mechanism includes a tether having a length for providing an assembly distance from the housing mount. The retrofit light emitting diode (LED) structure also includes a retaining mechanism, wherein a base of the retaining mechanism includes a profile for engagement to the race of the track bracket and retaining arms extend through the opening to the race for reversible engagement to slots in the housing mount for the LED panel.

BRIEF DESCRIPTION OF THE DRAWINGS

The following description will provide details of embodiments with reference to the following figures wherein.

DETAILED DESCRIPTION

Figure 1:
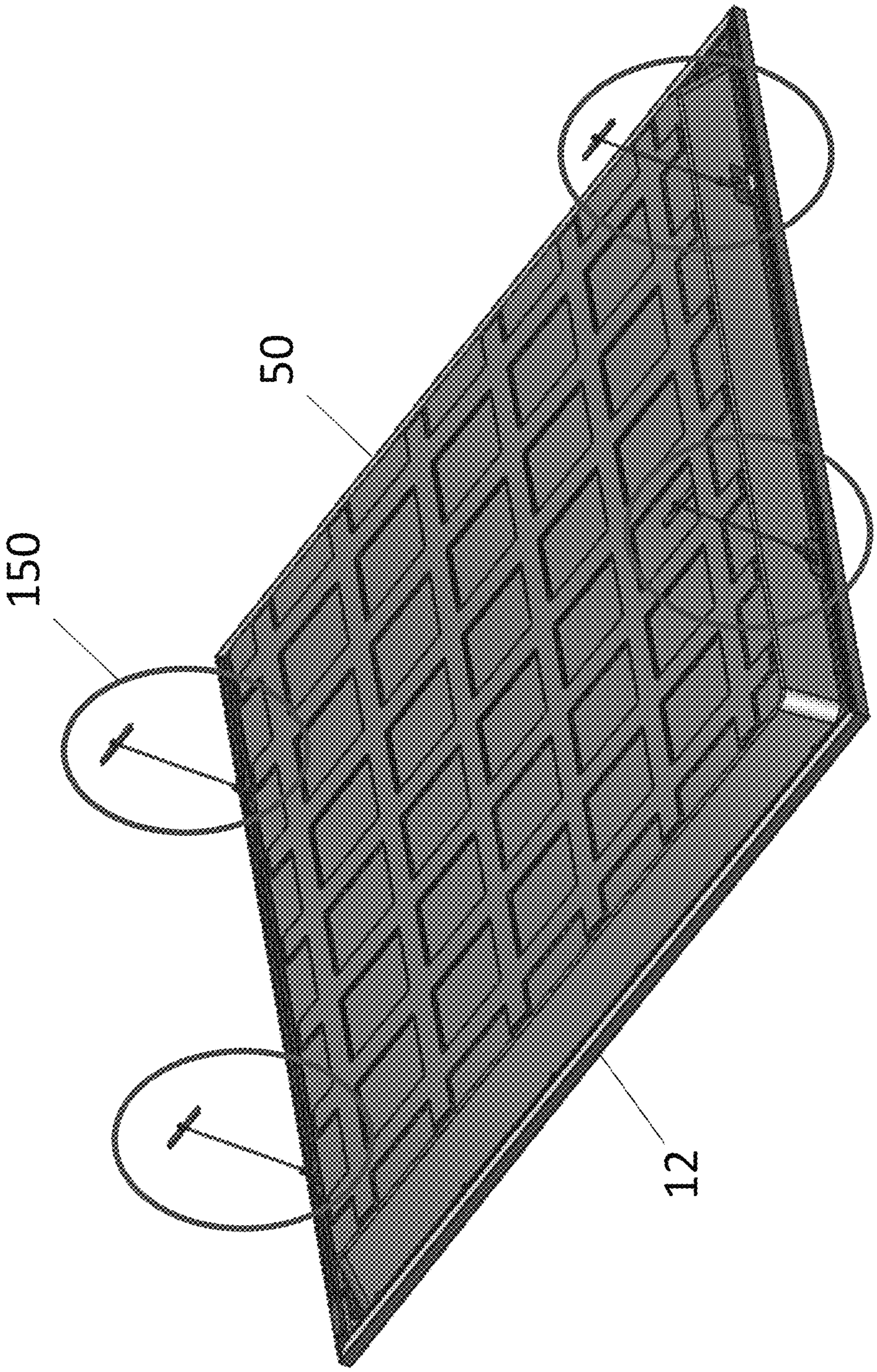
FIG. 1 is a perspective view of an assembly mechanism attached to the housing of a light emitting diode (LED) based luminaire for the luminaire retrofit kit of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Retrofitting a fluorescent light fixture with an LED panel can include removing the entire fluorescent light fixture, e.g., lens, bulbs, ballasts, and housing components such as ballast cover, etc. The added time and expense associated with such complete removal in the case of retrofitting can become extremely burdensome. Accordingly, there is a need for an LED panel system that can be easily retrofitted into existing ceiling-mounted light fixtures with minimal time and expense that replicate the appearance and electrical efficiency of modern LED panels.

For the methods and structures of the present disclosure, a luminaire retrofit kit design is proposed that has installation features, such as assembly and retaining mechanisms, that can facilitate installation of the luminaire inside a traditional fluorescent fixture and thus helps save install time and costs. The assembly mechanism is fixed, and the retaining mechanism can be adjusted (slide) as needed.

Prior to the methods and structures of the present disclosure, a retrofit luminaire used to be installed in the traditional fluorescent housing using a metal mounting frame. The metal mounting frame consists of four individual rectangular metal bars. These four metal bars are added in sequence between the traditional fluorescent housing and the ceiling grid. These metal bars have features on end of each rectangular metal bars to engage onto the other bars and thus make the closed mounting frame. The metal mounting frame has installation features, such as two keyhole slots, and the Luminaire has corresponding features such as two mounting bolts (one of each end of the luminaire). The luminaire is temporarily hung on the mounting frame by aligning the mounting bolt on luminaire with the keyhole slots and sliding it in. Then after the electrical connections are made, the luminaire is pushed towards the ceiling and fully mounted using the retaining mechanism. This is a tedious and time-consuming process of fully installing the luminaire in the traditional fluorescent housing which adds significant labor costs.

As will further be described herein, the deficiencies of the aforementioned method are overcome by the retrofit system of the present disclosure that includes an assembly mechanism structure and retaining mechanism structure, which can help to lower the cost of installation, saves on the installation time, and is easy and quick to install.

The driver structures and methods that are provided herein are now described with more detail with reference to FIGS. 1-32.

Figure 2:
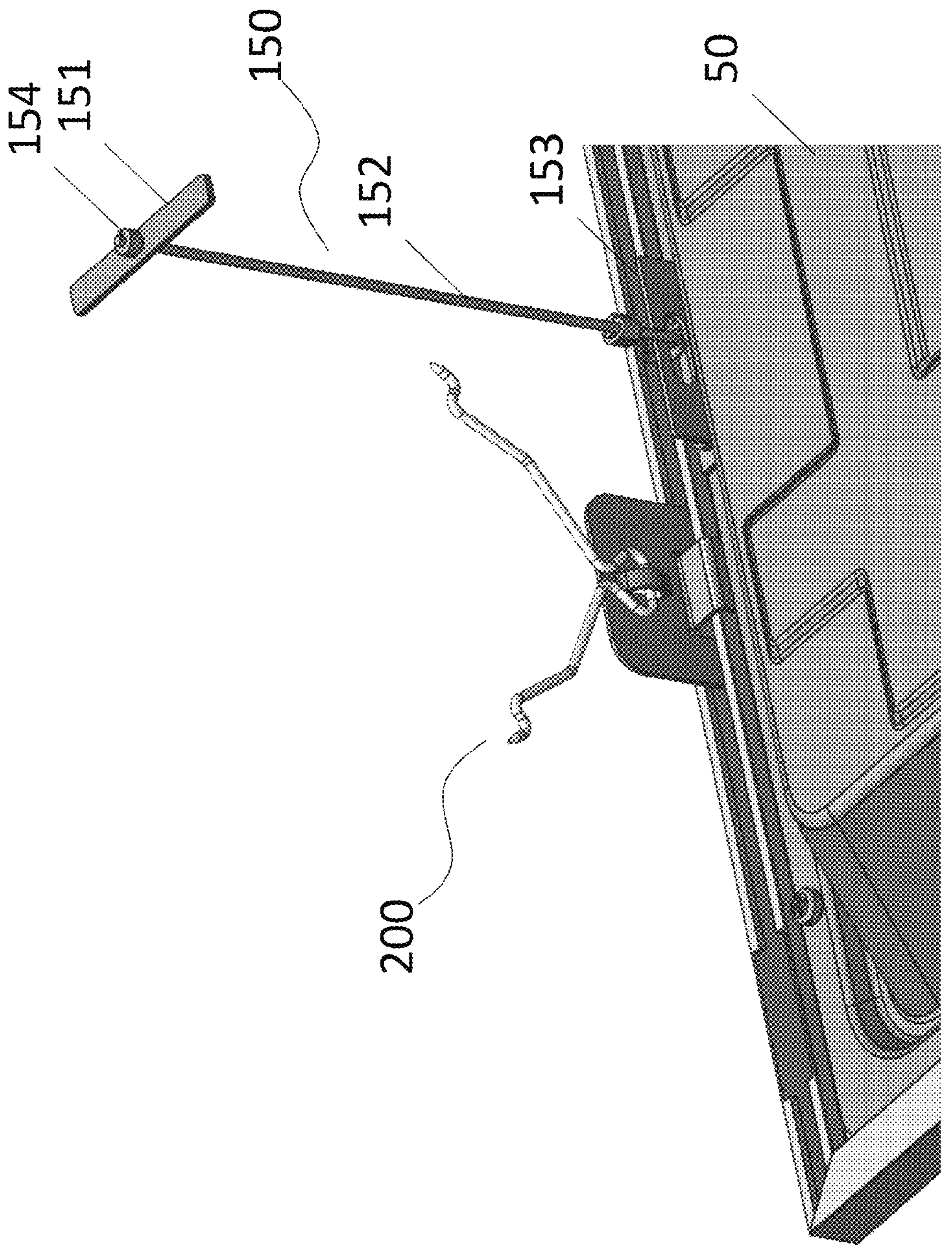
FIG. 2 is a perspective view of a retaining mechanism attached to the housing of a light emitting diode (LED) based luminaire for the luminaire retrofit kit of the present disclosure.

Referring to FIGS. 1 and 2, in one embodiment, the luminaire retrofit kit 100 includes an assembly mechanism 150 and a retaining mechanism 200. FIG. 1 illustrates the assembly mechanism 150 attached to the housing 50 of a light emitting diode (LED) based luminaire for the luminaire retrofit kit of the present disclosure. FIG. 2 illustrates a retaining mechanism attached to the housing of a light emitting diode (LED) based luminaire for the luminaire retrofit kit of the present disclosure.

Figure 3:
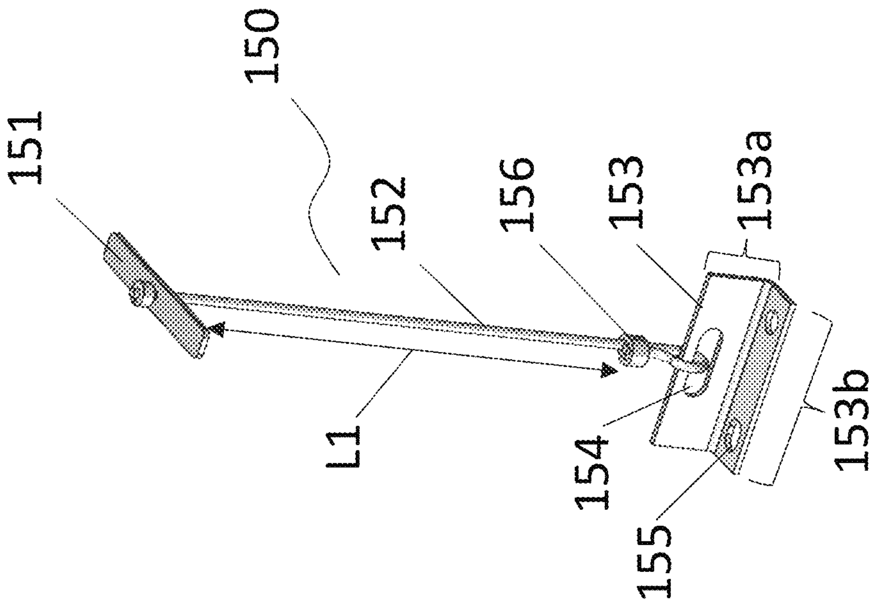
FIG. 3 is a magnified view of an assembly mechanism, in accordance with one embodiment of the present disclosure.
Figure 4:
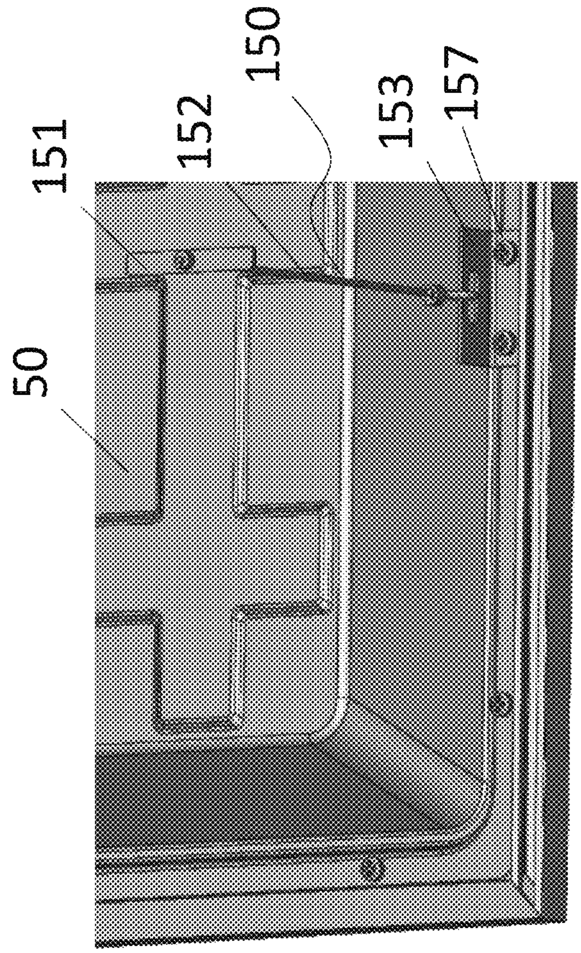
FIG. 4 is a perspective view of an assembly mechanism, as depicted in FIG. 3, that illustrates engagement of the bracket of the assembly mechanism to the base of the retrofit luminaire by fasteners.

Referring to FIGS. 1, 3 and 4, the assembly mechanism structure 150 is one of the design features for the luminaire retrofit kit that provides key design features for easy and quick installation. The assembly mechanism structure 150 includes a rod 151, a tether cable 152 and a housing bracket 153.

Figure 5:
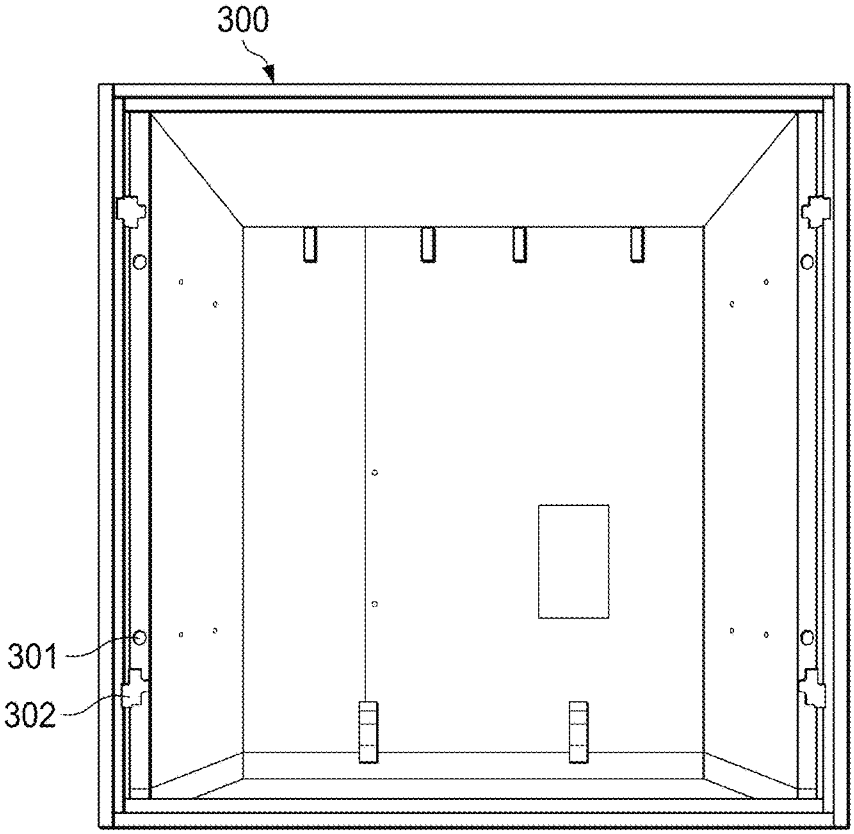
FIG. 5 is a perspective view illustrating one embodiment of a pre-installed fluorescent base housing.
Figure 6:
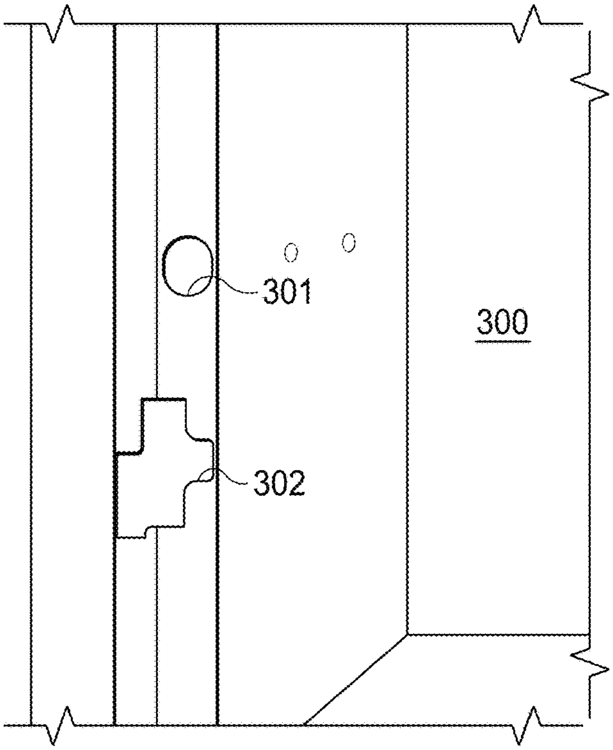
FIG. 6 is a magnified view of the slot and opening that are typical of a fluorescent base housing.

The rod 151 provides an engagement point for the assembly mechanism structure 150 to the pre-installed fluorescent base housing 300. FIG. 5 illustrates one embodiment of a pre-installed fluorescent base housing 300, and FIG. 6 illustrates a magnified view of the slot 302 and opening 301 that are typical of a fluorescent base housing 300. As will be described herein, the rod 151 that is on the end of the tether cable 152 that is opposite the end of the tether cable 152 that is connected to the luminaire housing 300 is inserted into the opening 301 in the fluorescent base housing 300 during the retrofit installation of the light emitting diode (LED) luminaire.

Referring to FIGS. 1, 3 and 4, in some embodiment, the rod 151 may be composed of rigid material, such as a metal or rigid plastic. The dimensions of the rod 151 are selected to allow for the rod 151 to an opening 301 in the fluorescent base housing 300.

For example, the rod 151 may be composed of a metal, such as aluminum or steel. The rod 151 may include an opening therethrough. The opening through the rod 151 may provide for the tether cable 152 to be passed therethrough. In some embodiments, the portion of the tether cable 152 that extends through the opening of the rod 151 may be engaged to the rod 151 by a fastener 156 In some examples, the fastener 156 may be an aviation cable terminal, in which the terminal engages the end of the tether cable 152 that extends through the opening of the rod 151. The diameter of the terminal is larger than the diameter of the opening through the rod 151. The terminal may be an end stop, ball stop, and the terminal may be installed using swage methods.

The tether cable 152 of the assembly mechanism structure may be any flexible rope, wire and/or cable. In one example, the tether cable 152 can be provided by an aircraft cable. Aircraft cables are stranded wires. As a general rule, Aircraft Cable is ⅜" and smaller, e.g., being available in 3⁄16" and ¼" sizes, which can each be suitable for the tether cable 152. The aircraft cable in 7×7 and 7×19 constructions. Aircraft Cables have a wire core in the same construction as the outer strands. Commercial quality "aircraft grade" cable is made from galvanized steel wire or stainless steel wire. Galvanized aircraft cable provides high tensile strength and adequate corrosion resistance for most commercial applications.

The length L1 of the tether cable 152 is selected to allow for the retrofit luminaire, e.g., luminaire base 50, to be secured to the fluorescent base housing 30 by engagement of the rod 151 to the opening 301 of the fluorescent base housing 300. However, the length L1 is also sufficient to allow for the luminaire base 50 to be manipulated, e.g., moved back and forth, while the rod 151 is engaged to the opening 301, which provides for the retrofit luminaire to be manipulated so that the retaining mechanism 200 can be engaged to the slot 302 of the fluorescent base housing 300 providing that the luminaire retrofit is seated in installation to the fluorescent base housing 300.

Referring to FIGS. 1, 3 and 4, the end (i.e., bracket end) of the tether cable 152 that is opposite the end of the tether cable 152 that is engaged to the rod 151 is attached to a bracket 153. The bracket end of the tether cable 152 may include an eye loop that engages an opening 154 in the vertical wall **153*a* of the bracket 153. The eye loop may include a fastener 156 that engages the end of the tether cable 152 in a closed loop, as depicted in FIG. 3. The fastener 156** may be connected by swage. An eye end, i.e., a terminal having an eye, may be substituted for the loop end.

Referring to FIG. 3, the bracket 153 is the portion of the assembly mechanism structure 150 that is engaged to the retrofit luminaire, e.g., base 50 of the retrofit luminaire. The bracket 153 is composed of a rigid material. For example, the bracket 153 may be composed of a metal or a rigid plastic. In some embodiments, the bracket 153 is composed of a metal, such as aluminum or steel. The bracket 153 may include a vertically orientated riser portion, e.g., a vertical wall **153*a*, and a base 153*b*. The vertical wall 153*a* may be disposed at a substantially 90 degree angle with the base 153*b* to provide that the bracket 153 has a substantially L-shaped geometry when viewed from a side view perspective. The vertical wall 153 may include at least one opening 154 for engagement by the eye loop of the tether cable 152, i.e., the bracket end of the tether cable 152. The base 153*b* of the bracket 153 includes at least one fastener opening for engagement of the bracket 153 to the housing of the retrofit luminaire, e.g., base 50** of the retrofit luminaire.

FIG. 4 illustrates engagement of the bracket 153 to the base of the retrofit luminaire by fasteners 157. For example, the fasteners 157 may be rivets, screws or may be provided by nut and bolt arrangements. As illustrated in FIG. 1, the bracket 153 may be used to engage the tether cable 152 of the assembly mechanism structure 150 to the luminaire base 50 at its perimeter, which includes a lip that is adjacent to a portion of the body that is recessed to provide depth for housing the light engine and components through which the luminaire provides lighting. In some embodiments, the bracket 153 of the assembly structure 150 is engaged to the lip of the luminaire base 50. As illustrated, four of the assembly mechanism structures 150 may be engaged to the base 50 of the luminaire, in which one of the assembly mechanism structures 150 are positioned at each of the four corners of the rectangular shaped luminaire base 50. It is noted that this is only one example of the retrofit luminaire assembly, and it is not intended that the present disclosure be limited to only this example.

In some embodiments, the assembly mechanism structure 150 helps with assembly of the luminaire, e.g., retrofit light emitting diode (LED) luminaire, inside the traditional fluorescent housing 300. The assembly mechanism structures 150 may be attached, e.g., factory installed, onto the back of the housing for the retrofit light emitting diode (LED) luminaire, e.g., base 50 of the luminaire. The location of the assembly mechanism structure 150 are fixed; and the location is optimized based on the installation slot 302 location on the traditional fluorescent housing 300.

During installation, the slim rod 151 on other end of the tether 152 is inserted in the hole 301 of the traditional fluorescent housing 200 (near the mounting slot 302) and pulled back. This helps the luminaire to hang from the traditional fluorescent housing 300, which will help to do the next installation step.

FIGS. 2 and 7-31 illustrate some embodiments of the retaining mechanism 200 that can be engaged to the slot 302 of the fluorescent base housing 300 to provide that the luminaire retrofit is seated in installation to the fluorescent base housing 300. In some embodiments, the retaining mechanism 200 is a mechanism that helps to fully retain/install the luminaire inside the traditional fluorescent housing 300 which helps keep the luminaire stay in flush with the ceiling.

The retaining mechanism includes a track bracket 201, and at least one retaining clip assembly 210*b*, 210*c*, 210*d*, 210*e*. The track bracket 201 connects the retaining mechanism to the luminaire housing 50. The track brackets 201 are attached to the back of the luminaire (either factory or field installed). The design of the retaining mechanism 200 is such that the retaining clip assembly 210*a*, 210*b*, 210*c*, 210*d*, 210*e* is snapped (or inserted) inside the extruded profile of the track bracket 201 that is connect to the luminaire. The location of the retaining mechanism 200 is optimized based on the location of the installation slot 302 of the traditional fluorescent housing 300. These retaining mechanism 200 can be adjusted by sliding the retaining clip assembly 210*a*, 210*b*, 210*c*, 210*d*, 210*e* inside the extrusion, i.e., track bracket 201, by the customer based on the slot location 302 in the traditional fluorescent housing 300. During installation, of the retrofit light emitting diode (LED) luminaire to the traditional fluorescent housing 300, the torsion springs 205 are compressed and then inserted inside the open slot, e.g., installation slot 302, of the traditional fluorescent housing 300. After insertion into the slot 302, the torsion springs 205 are released, and the design of the torsion spring 205 pulls the luminaire, i.e., retrofit light emitting diode (LED) luminaire, towards the traditional fluorescent housing 300, and keeps it flush with the ceiling. In some embodiments, the hook on the end of the spring 205 helps keep the luminaire in the housing. In some embodiments, there are about four retaining mechanisms 200 per luminaire.

FIGS. 7-11 illustrate one embodiment of a retaining mechanism 200. The retaining mechanism 200 may include a track bracket 201. The track bracket 201 may be composed of a rigid material, e.g., a plastic or metal. For example, the track 201 may be composed of an extrusion of a metal, such as aluminum or steel. The extrusion process by which the track 201 is formed provides that the track 201 has the same cross-sectional across it's length, i.e., the entirety of the length, but for sections that have been machined. For example, the extrusion may be machined to provide slot openings for insertion of the retaining clip assembly 210*a*, 210*b*, 210*c*, 210*d*, 210*e*, as well as fastener openings through which a fastener may be used engage the track 201 to the luminaire housing 50.

Figure 7:
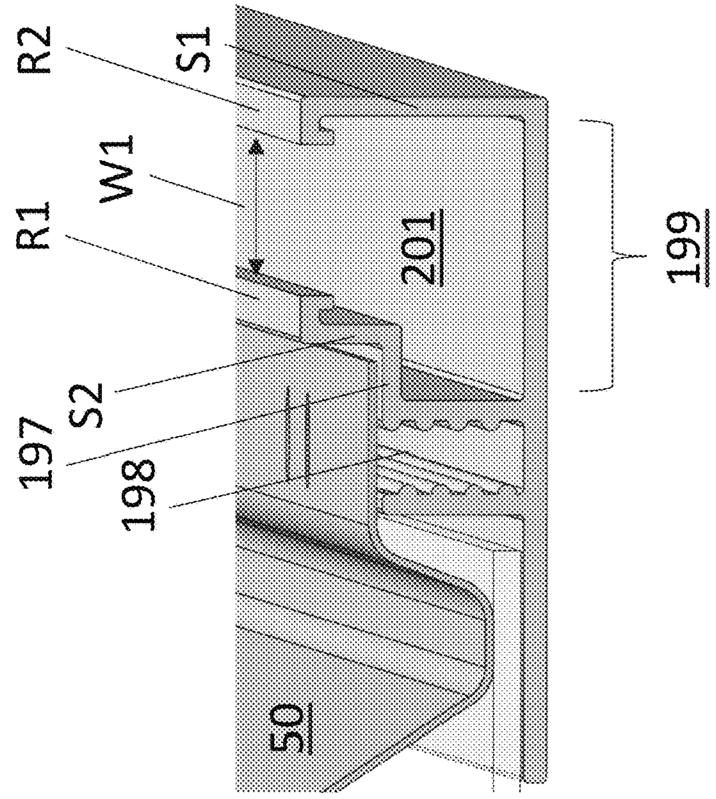
FIG. 7 is a perspective view of the cross-section illustrating a track bracket includes a retaining profile having at two ridges, in which at least one of the two ridges is for engaging a portion of the retaining mechanisms, in accordance with one embodiment of the present disclosure.

Referring to FIG. 7, the track 201 includes a retaining profile having at two ridges R1, R2, in which at least one of the two ridges R1, R2 is for engaging a retention tab 203 of the retaining clip bracket 202. The ridge R1, R2 when viewed from a side cross-sectional view is part of an inverted "J" shape when viewed with sidewalls S1, S2 of the trench 201 that the ridges extend into. The trench of the track may also be referred to as a race of the track 201. The height of the sidewalls S1, S2 is selected to provide a trench 199 for the track having a sufficient depth for engaging the retention tab 203. The width W1 separating the ridges R1, R2 at the ends of the sidewalls S1, S2 of the track 201 is selected so that the retention tab 203 can deform into a compressed position as the retention tab 203 is pushed into the race 199 of the track 201. The width W1 is also selected to provide that after the retention tab 203 is pushed through the opening defined by the space separating the ridges R1, R2, the retaining end (also referred to as shrapnel) of the retention tab 203 can deflect back to its original geometry that it had prior to being deformed while pressed through the opening to the race of the track 201. As will be described below, when the retention tab 203 deflects, the retaining end can snap into the one of the retaining ridge R1, R2.

Still referring to FIG. 7, the race 199 of the track 201 is adjacent to a fastener engagement portion 198. As noted above, the track bracket 201 can be connected to the retrofit light emitting diode (LED) luminaire using fasteners, such as screws, and or nut and bolt arrangements. As illustrated in FIG. 7, the fastener engagement portion 198 may included a threaded sidewall. In some embodiments, the track bracket 201 may also include an extension (retention extension 197) that provides additional retention support for the retrofit light emitting diode (LED) luminaire.

Figure 8:
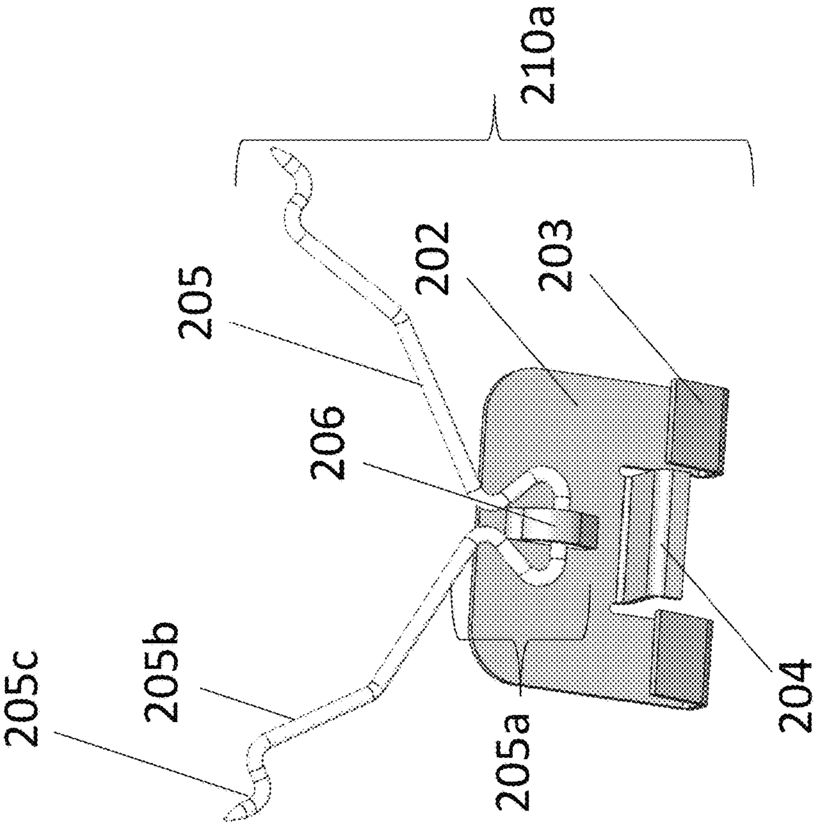
FIG. 8 is a perspective view illustrating a retention clip assembly that can be used to engage the track bracket that is illustrated in FIG. 7, in which the retention clip assembly may include a retention clip back that provides for a retention loop for the torsion spring, as well as two inner retention tabs and an outer retention tab, in accordance with one embodiment of the present disclosure.

FIG. 8 illustrates one embodiment of a retention clip assembly 210*a* that can be used to engage the track bracket 201 that is illustrated in FIG. 7. For example, the retention clip assembly 210*a* may include a retention clip back 202 that provides for a retention loop 206 for the torsion spring 205, as well as includes two inner retention tabs 203 and an outer retention tab 204. The aforementioned elements are within a unitary structure that may be composed of a metal, such as steel or aluminum. For example, the aforementioned elements of the retention clip assembly may be formed from sheet metal and stamped. The two inner retention tabs 203 are for engagement to the inner surfaces of at least one of the ridges R1, R2, once they have been pressed through the opening to the race 199 of the track 201 depicted in FIG. 7

Referring back to FIG. 8, the retention clip assembly 210*a* also includes a torsion spring 205. The torsion spring 205 depicted in FIG. 8 may be composed of high carbon spring steel in wire form. The torsion spring 205 includes a partial loop 205*a* for engagement to the retention loop 206 of the retention clip back 202. The torsion spring 205 may also include arms 205*b* that extend from the partial loop in a V-shaped geometry. In some embodiments, the tips of the arms 205*b* each include a hook that is designated by reference number 205*c*. The width of the V-shaped geometry for the arms 205*b* of the torsion spring 205, and the deflecting nature of the torsion spring material allows for the torsion spring 205 to be compressed to width that allows for the arms 205*b* of the torsion spring 205 to be inserted into the installation slot 302 of the of the pre-installed fluorescent housing 300. By "pre-installed" it is meant that the fluorescent housing 300 is mounted to the ceiling prior to the retrofit light emitting diode (LED) being installed to the fluorescent housing.

Figure 9:
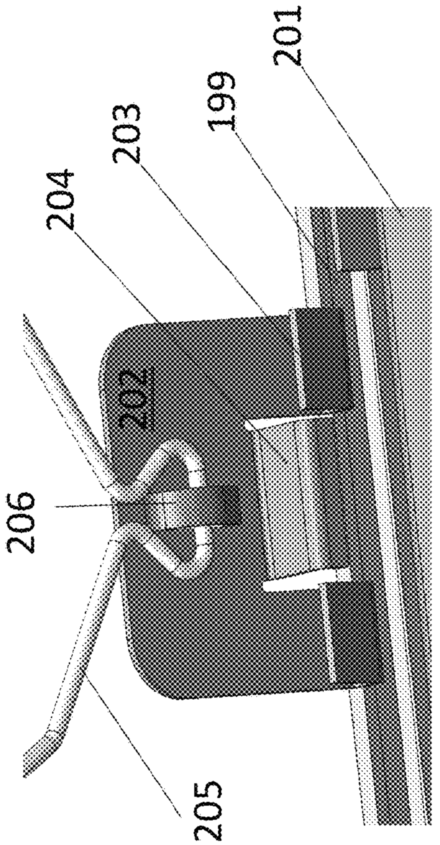
FIG. 9 is a perspective view that illustrates the retention clip assembly depicted in FIG. 8 in a pre-installed position proximate to the opening between the ridges of the track, in which the opening leads to the race of a track bracket, in accordance with one embodiment of the present disclosure.
Figure 10:
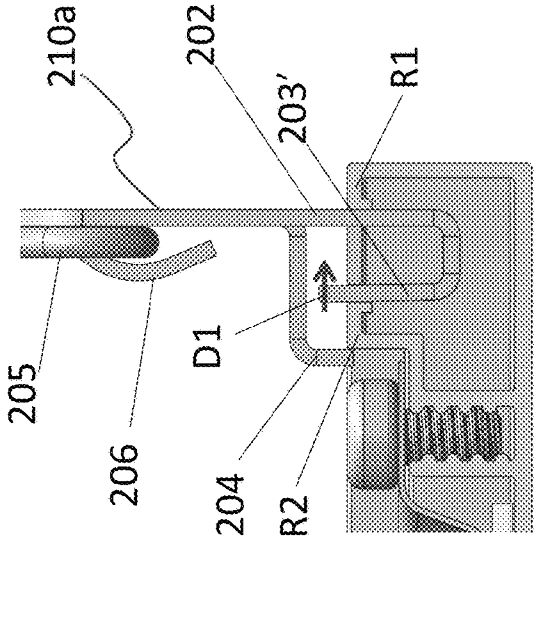
FIG. 10 is a perspective view that illustrates the initial insertion of the retention clip assembly depicted in FIG. 9 into the opening of the track bracket to the race of the track that is defined between the ridges, in accordance with one embodiment of the present disclosure.
Figure 11:
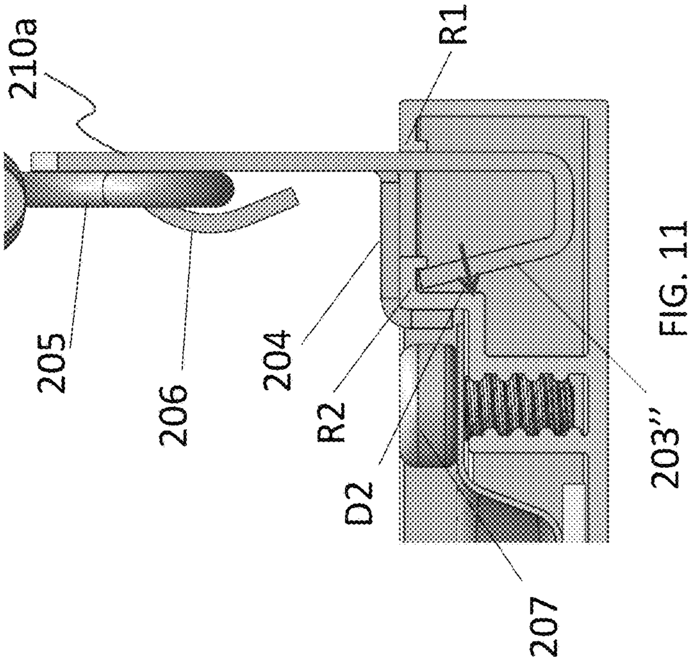
FIG. 11 is a perspective view that illustrates the retention clip assembly depicted in FIG. 9 after the retaining tabs of the clip are fully inserted into the race of a track bracket.

FIGS. 9-11 illustrate one embodiment of engagement of the retention clip assembly 210*a* that is depicted in FIG. 8 being inserted into the track bracket 201 that is depicted in FIG. 7. FIG. 9 illustrates the retention clip assembly 210*a* in a pre-installed position proximate to the opening between the ridges R1, R2 of the track, in which the opening leads to the race 199 of the track 201.

FIG. 10 illustrates the initial insertion of the retention clip assembly 210*a* into the opening of the track bracket 201 to the race 199 of the track that is defined between the ridges R1, R2. The outer retention tab 204 engages the outer surface of the inner sidewall S2 that is present between the race 199 of the track and the portion of the track bracket 201 that includes the fastener engagement portion 198. Still referring to FIG. 10, the two inner tabs 203' are depicted as being deformed (compressing the spring) in a first direction D1. At the stage of installation depicted in FIG. 10, the back surface of the inner retaining tabs 203' are in direct contact with the first ridge R1, and the deformable opposing surface (also referred to as retaining prong) of the inner retaining tabs 203' are in direct contact with the second ridge R2. Because the width of the opening to the race 199 of the track is narrower than the relaxed with of the retaining tabs 203 (as depicted in FIGS. 8 and 9), pressing the inner retaining tabs 203 against the ridges compresses the retaining tabs.

FIG. 11 illustrates the retaining tabs 203" after they have been fully inserted into the race 199 of the track 201. When fully inserted, the end of the retaining tabs 203" extend beyond the ridges R1, R2 of the sidewalls S1, S2 that provide the track 201, wherein once fully inserted, any force that compressed the inner retaining tabs 203 is removed, which allows the inner retaining tabs 23 to relax. As the inner retaining tabs 203 relax, the retaining prong portion of the retaining tabs 203 deflects in a second direction D2 (opposite the first direction D1) to provide that the retaining prong snaps back into engagement with at least one of the retaining ridges R1, R2. In the embodiment that is depicted in FIG. 11, the retaining prong of the inner retaining tabs 203 snaps back into the retaining ridge that is identified by reference number R2, which is present between the fastener engagement portion 198 and the race 199. As the inner retaining tabs 203 are fully seated, the outer retention tab 203 caps the outer surfaces of the retaining ridge R2 that the retaining prong has engaged.

FIGS. 10 and 11 further illustrate how fasteners 207 are used to engage the track bracket 201 to the luminaire housing 50. As illustrated in FIGS. 10 and 11, the fasteners extend through a hole in the luminaire base housing 50, and are received in threaded engagement to the track 201.

Figure 12:
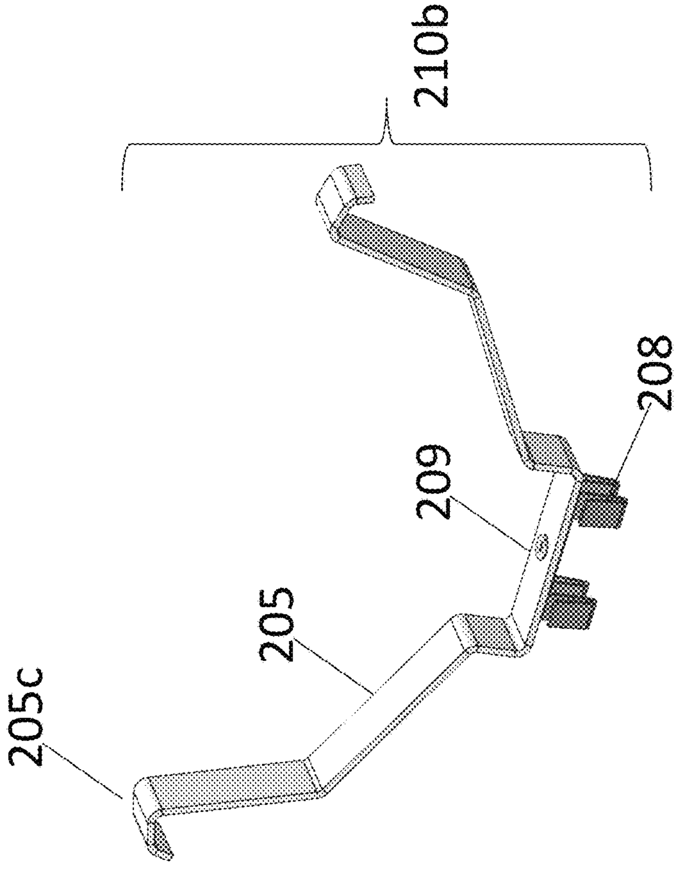
FIG. 12 is a perspective view illustrating one embodiment of a retention clip assembly that includes retaining tabs having retaining prongs facing in opposing directions to engage both ridges of the track bracket, in accordance with one embodiment of the present disclosure.
Figure 18:
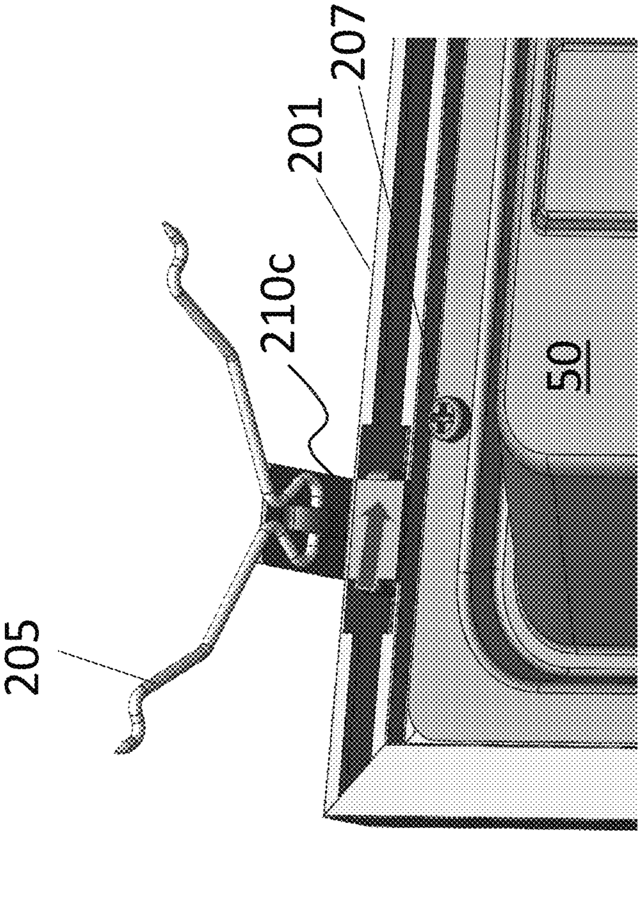
FIG. 18 is a perspective view that illustrates the retaining clip assembly depicted in FIG. 16 being inserted into the installation opening prior to the retaining clip assembly being slid into the portion of the track adjacent to the installation opening having a reduced width including retaining ridges for retaining the sliding tabs of the retaining clip assembly in the race, in accordance with one embodiment of the present disclosure.
Figure 20:
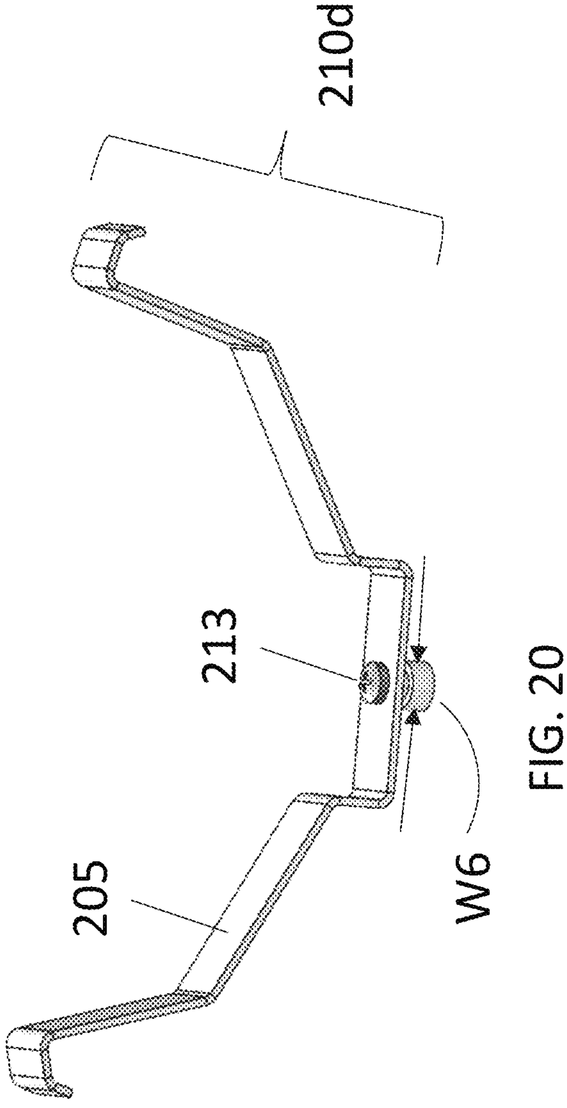
FIG. 20 is a perspective view that illustrates one embodiment of a retention clip assembly for use with the track bracket that includes a torsion spring, a holder boss, and a holder boss fastener, in accordance with one embodiment of the present disclosure.

FIGS. 12-15 illustrate yet another embodiment of the present disclosure. FIG. 12 illustrates one embodiment that includes retaining tab 208 that are similar to the embodiments described with reference to FIGS. 8-11. However, the retention clip assembly 210*b* that is depicted in FIGS. 12-15 includes retaining tabs 208 having retaining prongs facing in opposing directions to engage both ridges R1, R2 of the track bracket 201, which is differentiated from the retaining tabs 203 of the embodiment depicted in FIGS. 8-11 that only include retaining prongs facing in one direction. The retaining tabs 208 depicted in FIG. 12 may be composed of stamped metal, e.g., steal or aluminum, similar to the retaining tabs 203 that have been described above with reference to FIGS. 8-11. However, the retaining tabs 208 do not include a vertically orientated retention clip back 202. Instead, the retaining tabs 208 are connected to a torsion spring 205 by fasteners 209, e.g., a rivet, threaded bolt and/or nut and bolt arrangement. In the example depicted in FIG. 12, the fastener 209 is a rivet. The torsion spring 205 may be composed of high carbon spring steel in flat form, as depicted, or the torsion spring may be composed of high carbon spring steel in wire form. Similar to the torsion spring 205 that is depicted in FIG. 18, the torsion spring 205 that is illustrated in FIG. 12 may include two arms positioned to provide a V-shape, and a hook may be positioned at the end of each arm.

Figure 13:
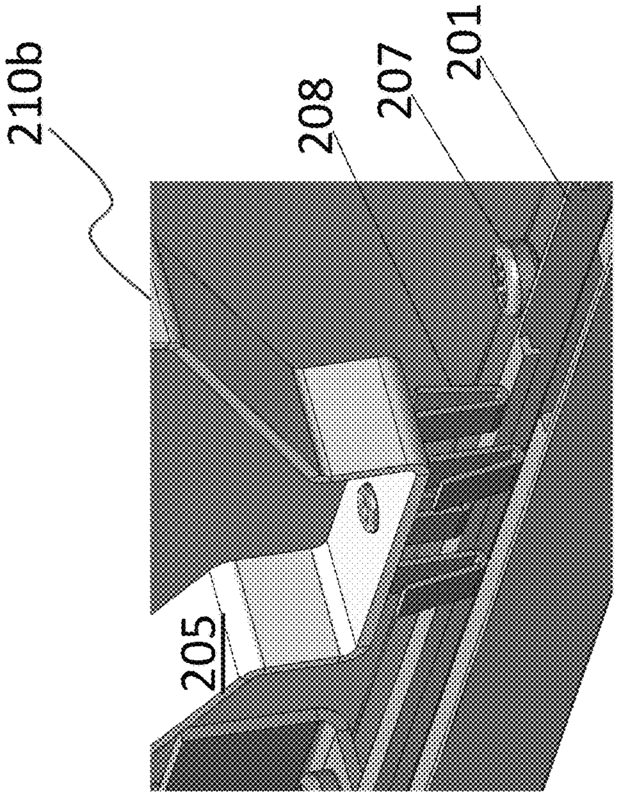
FIG. 13 is a perspective view that illustrates the initial insertion of the retention clip assembly depicted in FIG. 12 into the opening of the track bracket to the race of the track that is defined between the ridges, in accordance with one embodiment of the present disclosure.

FIG. 13 illustrates the retention clip assembly 210*b* in a pre-installed position proximate to the opening between the ridges R1, R2 of the track, in which the opening leads to the race 199 of the track 201.

Figure 14:
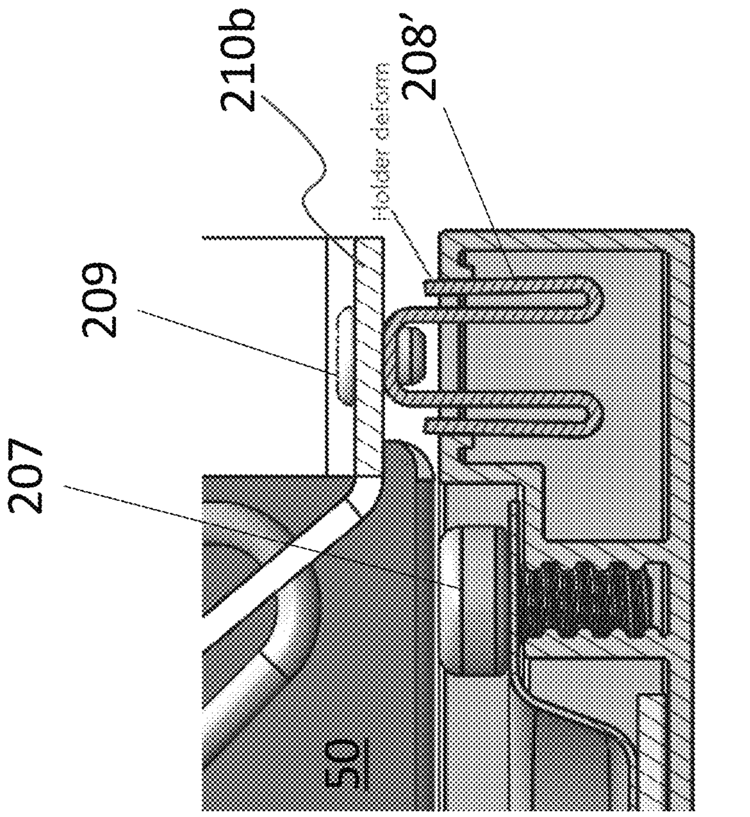
FIG. 14 is a perspective view that illustrates the retention clip assembly depicted in FIG. 12 just before the retaining tabs are fully inserted into the race of a track bracket, in accordance with one embodiment of the present disclosure.

FIG. 14 illustrates the initial insertion of the retention clip assembly 210*b* into the opening of the track bracket 201 to the race 199 of the track that is defined between the ridges R1, R2. The retaining clip assembly 210*b* does not include an outer retention tab, such as the outer retention tab of the embodiment that is described with reference to FIGS. 8-11. The retention clip assembly 210*b* only includes inner retention tabs 208, e.g., four inner retention tabs 208. In the embodiment depicted in FIG. 14, the retention clip assembly 210*b* includes four inner retention tabs 208. The retention tabs 208 of the retention clip assembly 210*b* that is depicted in FIG. 14 include retention prongs that are positioned to engage each of the retaining ridges R1, R2. For example, two of the retention prongs are arranged so that the retaining prong of the retention tabs 208 snap into engagement of a first ridge R1 of the track bracket 201, and two of the retaining prongs are arranged so that the retaining prong of the retention tabs 208 snap into engagement of a second ridge R2.

Still referring to FIG. 14, the four retention tabs 208, e.g., inner retention tabs, are depicted as being deformed (compressing the spring) in a first initial direction. Because the width of the opening to the race 199 of the track is narrower than the relaxed width of the retaining tabs 208 (as depicted in FIGS. 12 and 13), pressing the inner retaining tabs 208 against the ridges compresses the retaining tabs.

Figure 15:
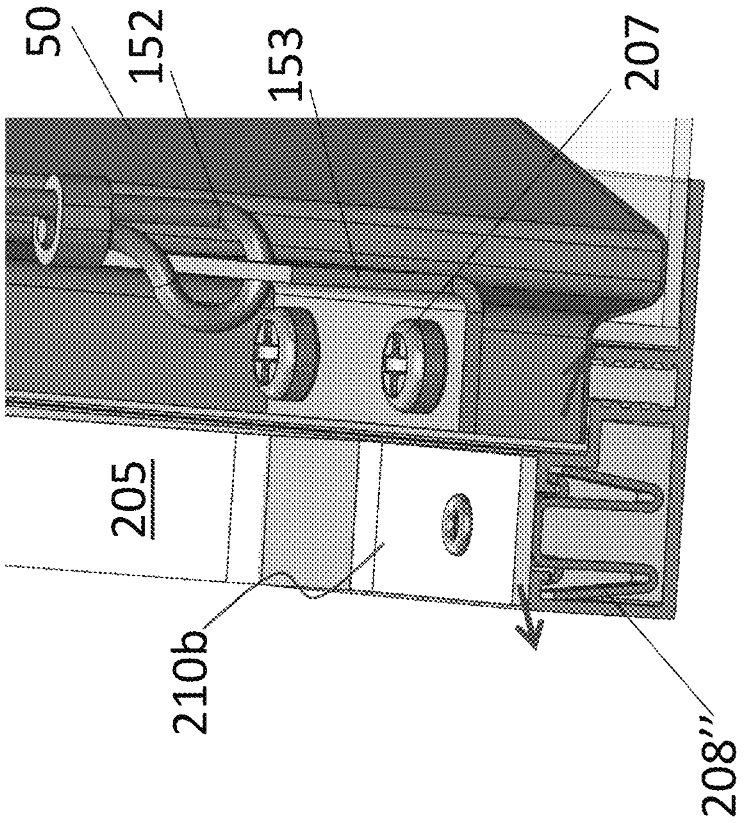
FIG. 15 is a perspective view that illustrates the retention clip assembly depicted in FIG. 12 after the retaining tabs have been fully inserted into the race of the track bracket, in accordance with one embodiment of the present disclosure.

FIG. 15 illustrates the retaining tabs 208 after they have been fully inserted into the race 199 of the track 201. When fully inserted, the end of the retaining tabs 208 extend beyond the ridges R1, R2 of the sidewalls S1, S2 that provide the track 201, wherein once fully inserted, any force that compressed the retaining tabs 208 is removed, which allows the inner retaining tabs 208 to relax. As the inner retaining tabs 208 relax, the retaining prong portion of the retaining tabs 208 deflects in a direction opposite the direction of deformation depicted in FIG. 14 to provide that the retaining prong snaps back into engagement with at least one of the retaining ridges R1, R2.

FIGS. 13-15 further illustrate how fasteners 207 are used to engage the track bracket 201 to the luminaire housing 50. As illustrated in FIGS. 13-15, the fasteners 207 extend through a hole in the luminaire base housing 50, and are received in threaded engagement to the track 201.

Figure 16:
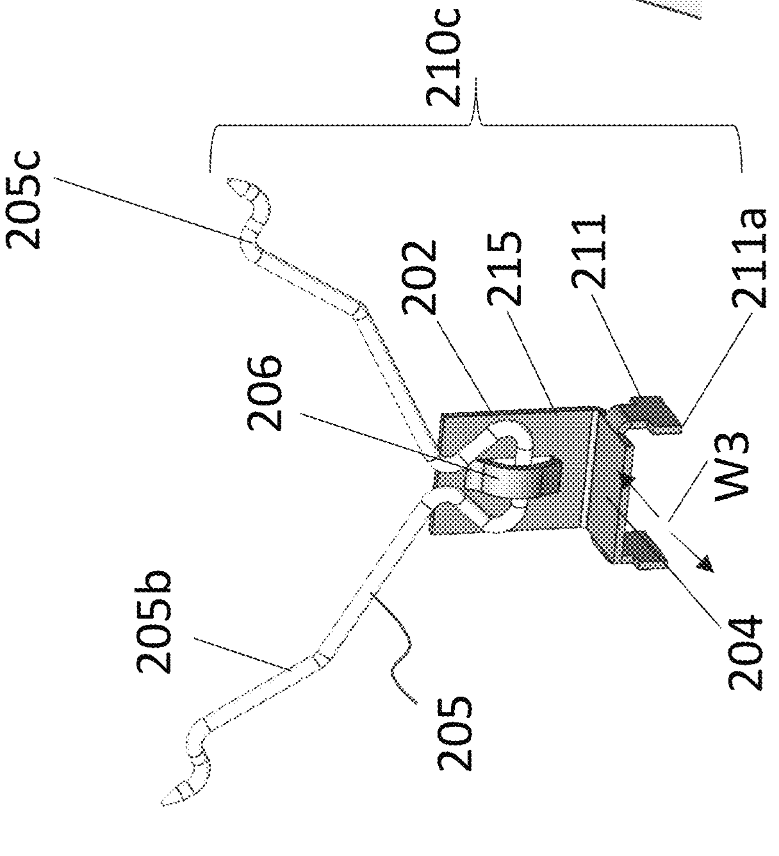
FIG. 16 is a perspective view that illustrates one embodiment of a retention clip assembly that includes a holder plate having sliding retaining tabs with a geometry corresponding to the geometry of the side cross-section of the race of the track bracket.

FIGS. 16-19 illustrate yet another embodiment of the present disclosure. FIG. 16 illustrates another embodiment of a retention clip assembly 210*c*. The retention clip assembly 210*c* illustrated in FIG. 16 includes a holder plate 215 having sliding retaining tabs 211 with a geometry corresponding to the geometry of the side cross-section of the race 199 of the track bracket 201. The holder plate 215 may be composed of a rigid material, such as a metal or plastic. For example, the holder plate 215 may be composed of steel or aluminum, which is stamped into the geometry depicted in FIGS. 16-19. Similar to the embodiment that is depicted in FIGS. 8-11, in some instances the holder plate 215 may include a vertically oriented portion, e.g., retention clip back 202, that includes a retention loop 206 for affixing the torsion spring 205 to the holder plate 215. The torsion spring 205 may be composed of high carbon spring steel in flat form, as depicted, or the torsion spring may be composed of high carbon spring steel in wire form. Similar to the torsion spring 205 that is depicted in FIG. 18, the torsion spring 105 that is illustrated in FIG. 12 may include two arms positioned to provide a V-shape, and a hook may be positioned at the end of each arm.

The holder plate 215 also includes a base portion for engaging the track bracket 201. In this instance, the retention clip assembly 210*c* includes sliding retaining tabs 211 that have an inverted T-shaped geometry. The inverted T-shaped geometry of the sliding tabs 211 includes a horizontally elongated portion 211*a* that has a width W3 that engaged the ridges R1, R2 of the track bracket 201. In the embodiment that is depicted in FIGS. 16-19, as opposed to the sliding retaining tabs 211 being deformed to be inserted into the race 199 of the track bracket 201 as employed in the embodiments depicted with reference to FIGS. 1-15, the retention clip assembly 210 is initially inserted into the race 199 of the track bracket through an installation opening 216. In this embodiment, the installation opening 216 may be machined into the extrusion that provides the track bracket 201. The installation opening 216 has a width W4 that exceeds the width W5 that separates the retaining ridges R1, R2.

Figure 17:
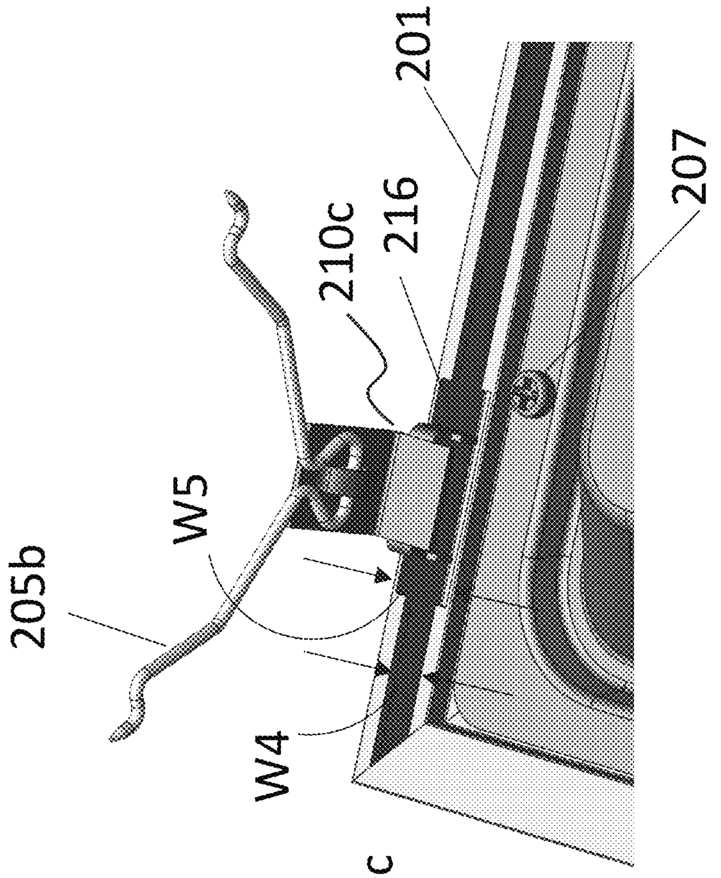
FIG. 17 is a perspective view that illustrates the retaining clip assembly depicted in FIG. 16 in a pre-installed position proximate to the installation opening of the track, in which the installation opening has a width that allows for insertion of the sliding tabs to the race of the track, in accordance with one embodiment of the present disclosure.

FIG. 17 illustrates the retaining clip assembly 210*c* in a pre-installed position proximate to the installation opening 216 of the track, in which the installation opening has a width W4 that allows for insertion of the sliding tabs 211 to the race 199 of the track 201.

FIG. 18 illustrates the retaining clip assembly 210*c* being inserted into the installation opening 216 prior to the retaining clip assembly 210*c* being slid into the portion of the track adjacent to the installation opening 216 having a reduced width W4 including retaining ridges R1, R2 for retaining the sliding tabs 211 of the retaining clip assembly 210*c* in the race 199.

Figure 19:
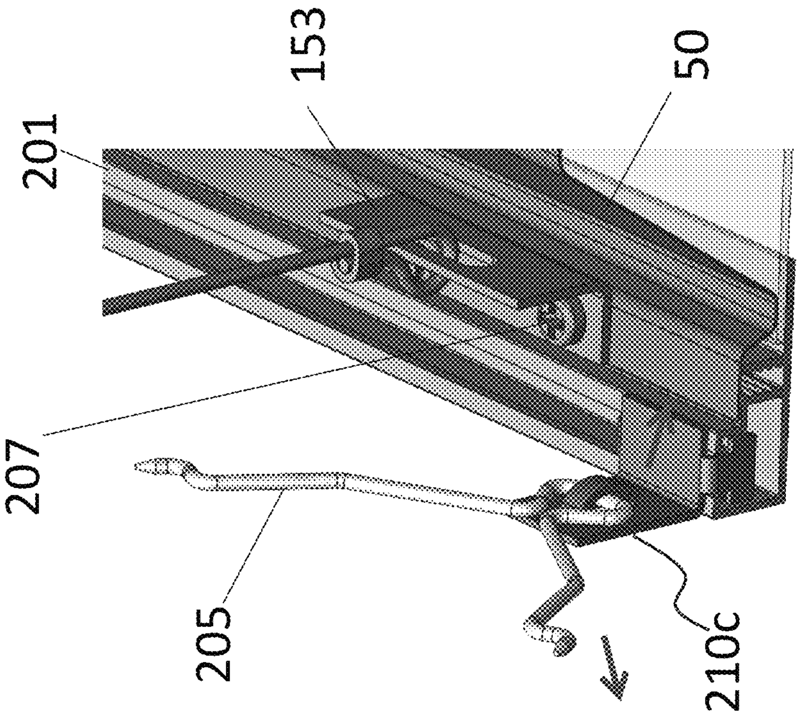
FIG. 19 is a perspective view that illustrates retaining clip assembly depicted in FIG. 16 being slid along the track bracket from the installation opening to a portion of the race at which the retaining ridges produce a lesser width than the installation opening, in accordance with one embodiment of the present disclosure.

FIG. 19 illustrates the retaining clip assembly 210*c* being slid along the track bracket 201 from the installation opening 216 to a portion of the race 199 at which the retaining ridges R1, R2 product a less width W4 than the installation opening 216. The reduced width W4 separating the retaining ridges R1, R2 is sufficient to obstruct the horizontally elongated portion 211*a* of the sliding tab (e.g., having a width W3) that engages the ridges R1, R2 of the track bracket 201 from being removed from the race 199.

Under these conditions, the retaining clip assembly 210*c* is first inserted into the race 199 of the track bracket 201 through the installation opening 216 having a width W5 for receiving the retention clip assembly 210*c*, and then the retention clip assembly 210*c* is slid into the portion of the track bracket 201 having a reduced width W4 including the retaining ridges R1, R2, at which the retaining ridges R1, R2 engage the horizontally elongated portion 211*a* of the sliding tabs 211.

FIGS. 17-19 further illustrate how fasteners 207 are used to engage the track bracket 201 to the luminaire housing 50. As illustrated in FIGS. 13-15, the fasteners 207 extend through a hole in the luminaire base housing 50, and are received in threaded engagement to the track 201.

FIGS. 20-23 illustrate yet another embodiment of a retention clip assembly 210*d* for use with the track bracket 201 (e.g., the track bracket 201 depicted in FIG. 7). The retention clip assembly 210*d* illustrated in FIG. 20 includes a torsion spring 205, a holder boss 212 and a holder boss fastener 213. The torsion spring 205 has been described above with reference to the embodiment that is depicted in FIGS. 12-15.

The holder boss 212 has a geometry, e.g., width W6, for insertion into the race of the track bracket 201 through an insertion opening 106; yet the geometry also allows for engaging the ridges R1, R2 of the track bracket 201 for securing the retention clip assembly 210*d* at a fixed position to the track bracket 201. The holder boss 212 may be composed of a rigid material, e.g., metal or plastic. In some embodiments, the holder boss 212 is composed of aluminum or steel. The head of the holder boss 212 may have a perimeter that can be substantially circular; however, multi-sided geometries are also contemplated. The head of the boss holder 212 is the portion of the holder boss 212 for insertion into the race 199 of the track bracket 201, and the head of the boss holder 212 can contact the ridges R1, R2.

The holder boss 212 includes an engagement point for engagement to the holder boss fastener 213. In some embodiments, the engagement point of the holder boss 212 is threaded for reversible engagement by a holder boss fastener 213 having a compatible thread. In addition to the thread of the holder boss fastener 213, the holder boss fastener 213 may also include a head that includes a drive. The drive may have the configuration of Phillips-head, flat-head, hex, torx, double hex, Robertson (scrulox), etc. The holder boss fastener 213 may be composed of steel, stainless steel and/or brass, but other materials may be equally suitable. Still referring to FIG. 20, the holder boss fastener 213 is inserted through an opening in the torsion spring 205, and the tip of the holder boss fastener 213 is then inserted into the holder boss 212, which fastens the torsion spring 205 to the holder boss 212.

Figure 21:
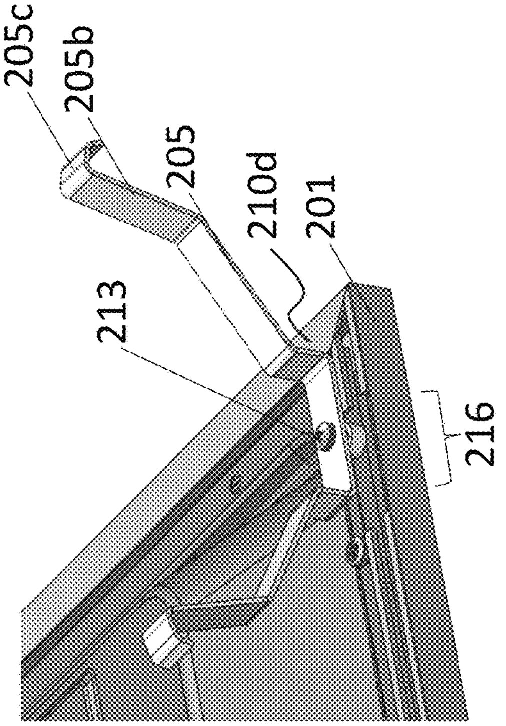
FIG. 21 is a perspective view that illustrates the retention clip assembly depicted in FIG. 20 in a pre-installed position proximate to the insertion opening of the track bracket, in accordance with one embodiment.
Figure 22:
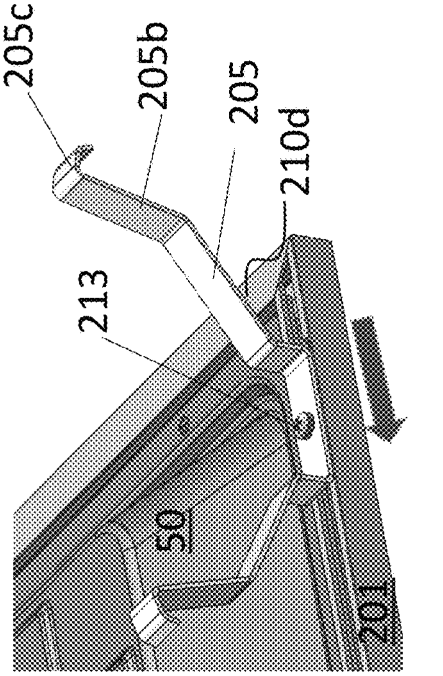
FIG. 22 is a perspective view that illustrates the initial insertion of the retention clip assembly depicted in FIG. 20 into the insertion opening of the track bracket to the race of the track that is defined between the ridges, in accordance with one embodiment of the present disclosure.
Figure 24:
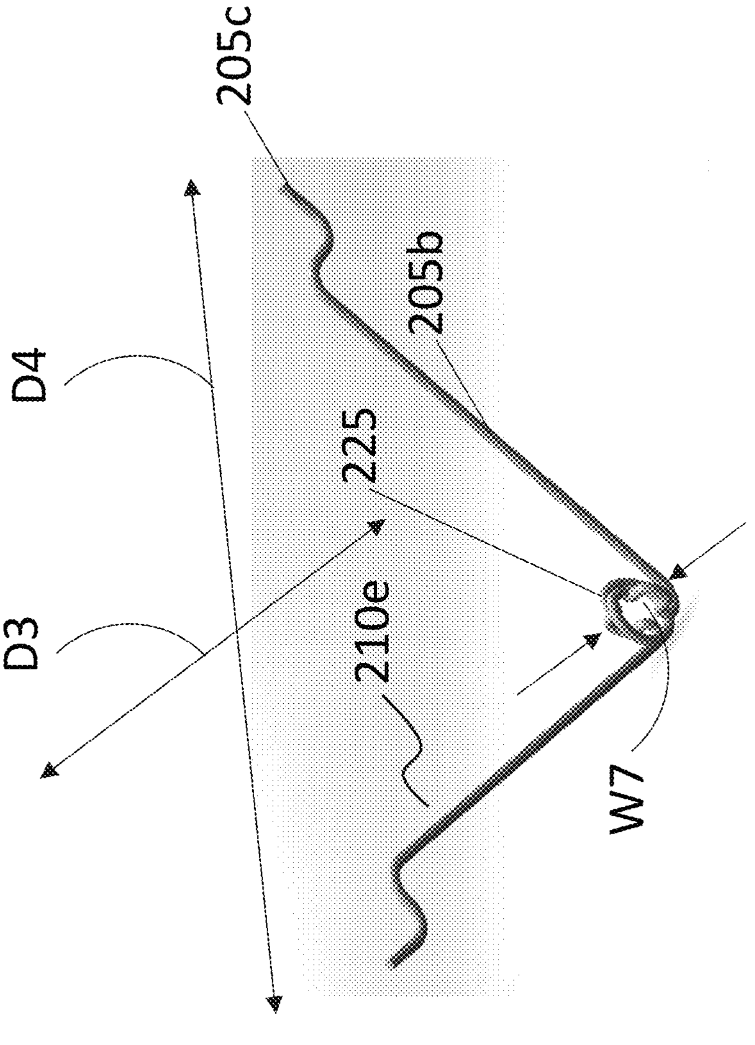
FIG. 24 is a perspective view of a torsion spring is configured to provide an entirety of the retention clip, in which the retention clip includes a base for engaging the retaining ridges of the track bracket.

FIG. 21 illustrates the retention clip assembly 210*d* in a pre-installed position proximate to the insertion opening 216 of the track 201. FIG. 22 illustrates the initial insertion of the retention clip assembly 210*d* into the insertion opening 216 of the track bracket 201 to the race 199 of the track that is defined between the ridges R1, R2. At the point of installation depicted in FIG. 22, the holder boss fastener 213 has not been driven to provide for clearance between the holder boss and the retaining ridges R1, R2 so that the retaining clip assembly 210*d* can be slid along the race 199 until in a position at which the retaining clip assembly 210*d* can be fixed for further installation of the retrofit of the light emitting diode (LED) luminaire to the fluorescent base housing 300. It is noted that the above concept may be avoided for providing for increased installation simplicity. The screw can be retightened in the factory to the necessary settings.

Figure 23:
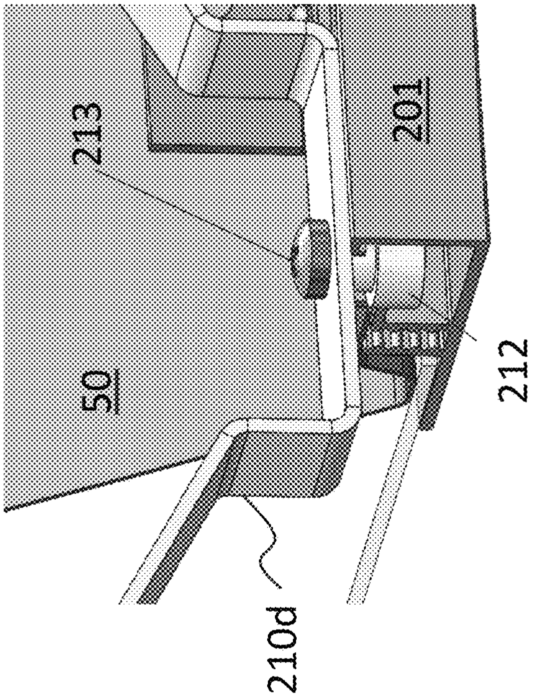
FIG. 23 is a perspective view that illustrates the retention clip assembly being traversed from the position in the track bracket including the insertion opening to a portion of the track bracket at which the race includes the retaining ridges, in accordance with one embodiment of the present disclosure.

FIG. 23 illustrates the retention clip assembly 210*d* being traversed from the position in the track bracket 201 including the insertion opening 216 to a portion of the track bracket 201 at which the race 199 includes the retaining ridges R1, R2. The torsion spring 205 is present on a first side of the retaining ridges R1, R2 that is exterior to the track 199. The head of the holder boss fastener 213 is also present on the first side of the retaining ridges R1, R21 that is exterior to the track 199. The threaded portion of the boss fastener 213 (as well as at least a portion of the shank portion (when present)) of the boss fastener 213) are present extending through the opening separating the retaining ridges R1, R2. The tip of the boss fastener 213, as well as the holder boss 212 are present within the race 199. In some embodiments, when the drive of the retaining fastener 213 is torqued, i.e., driven, the boss fastener 213 threads into the holder boss 212, which brings the head of the holder boss 212 into contact with the back surface of the retaining ridges, and secures the retention clip assembly into place at a fixed position to the track bracket 201.

FIGS. 21-23 further illustrate how fasteners 207 are used to engage the track bracket 201 to the luminaire housing 50. As illustrated in FIGS. 21-23, the fasteners 207 extend through a hole in the luminaire base housing 50, and are received in threaded engagement to the track 201.

FIGS. 24-27 depict yet another embodiment of the present disclosure, in which a torsion spring is configured to provide an entirety of the retention clip 210*e*. The retention clip 210*e* includes a base 225 for engaging the retaining ridges R1, R2 of the track bracket 201. Similar to the above described torsion spring 205, the retention clip 210*e* may be composed of high carbon spring steel in wire form. The torsion spring 205 may also include arms 205*b* that extend from the loop of the wire form spring steel material that provides the base 225 in a V-shaped geometry. In some embodiments, the tips of the arms 205*b* each include a hook that is designated by reference number 205*c*. The width of the V-shaped geometry for the arms 205*b* of the torsion spring 205, and the deflecting nature of the torsion spring material allows for the torsion spring 205 to be compressed to width that allows for the arms 205*b* of the torsion spring 205 to be inserted into the installation slot 302 of the of the pre-installed fluorescent housing 300. The base 225 includes a coil of the torsion spring wire with a width in a direction D3 perpendicular to the direction D4 that the arms 205*b* extend along. This provides the width W7 of the retention clip 210*e* that is positioned within the race 199 of the track bracket 201, and is retained within the race 199 of the track bracket 201 by the ridges R1, R2.

Figure 26:
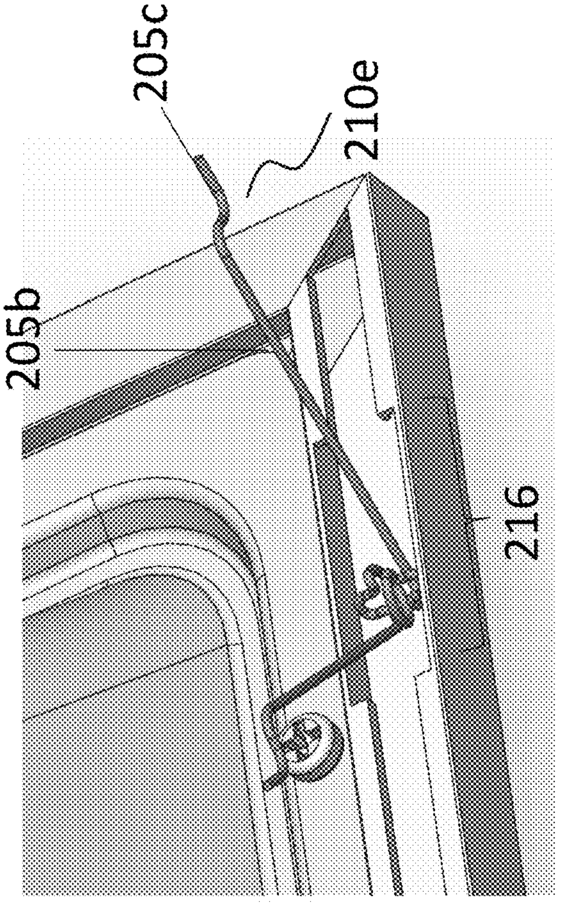
FIG. 26 is a perspective view that illustrates the initial insertion of the retention clip assembly into the insertion opening of the track bracket, in accordance with one embodiment of the present disclosure.
Figure 25:
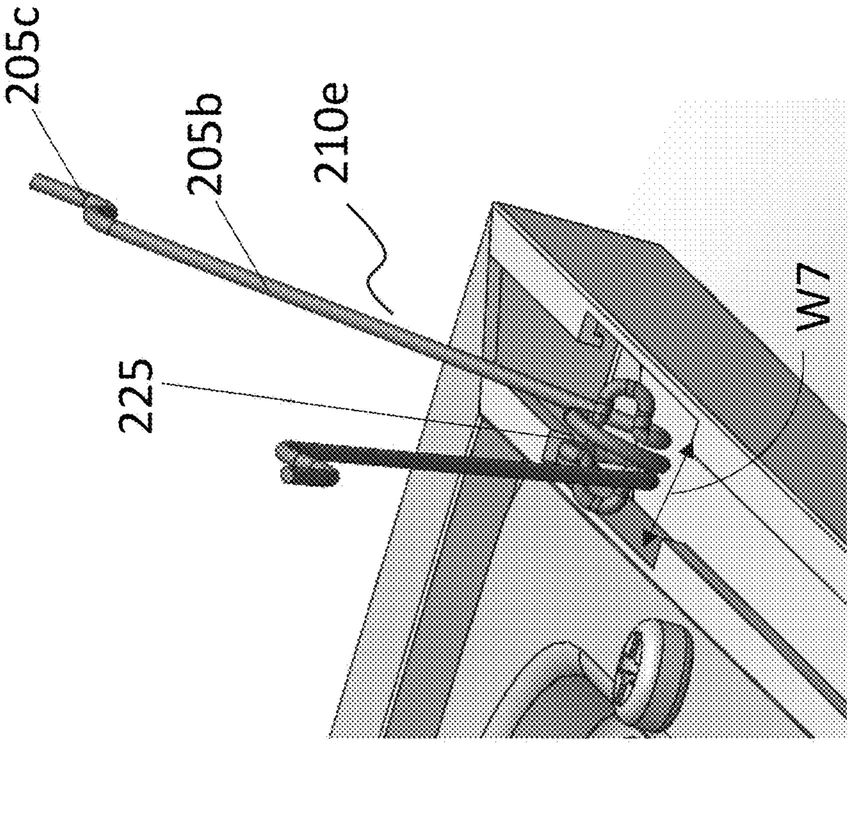
FIG. 25 is a perspective view that illustrates the retention clip in a pre-installed position proximate to the insertion opening of the track bracket, in accordance with one embodiment of the present disclosure.
Figure 27:
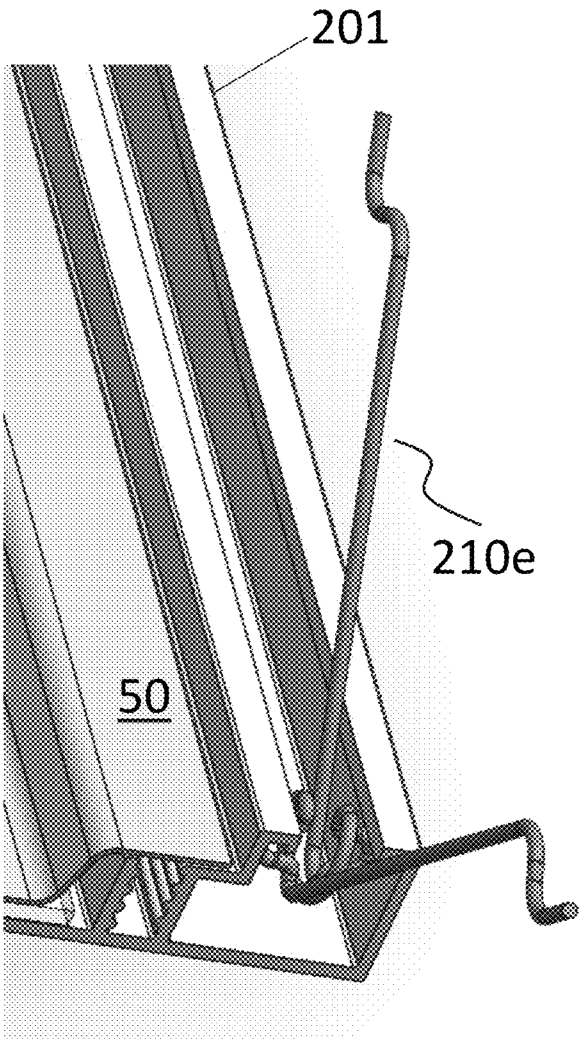
FIG. 27 is a perspective view that illustrates the retention clip being traversed from a position in the track bracket including the insertion opening to a portion of the track bracket at which the race includes the retaining ridges, in accordance with one embodiment of the present disclosure.

FIG. 25 illustrates the retention clip 210*e* in a pre-installed position proximate to the insertion opening 216 of the track 201. FIG. 26 illustrates the initial insertion of the retention clip assembly 210*e* into the insertion opening 216 of the track bracket 201. FIG. 27 illustrates the retention clip 210*e* being traversed from the position in the track bracket 201 including the insertion opening 216 to a portion of the track bracket 201 at which the race 199 includes the retaining ridges R1, R2.

Referring to FIG. 27, the arms 205*b* of the torsion spring that provide the retention clip 210*e* extend through an opening between the ridges so that a majority of the arms 205*b* are present on a first side of the retaining ridges R1, R2 that is exterior to the track 199. The base 225 of the retention clip 210*e* is present within the race 199. The width of the base 225 of the retention clip 201*e* is sufficiently wide to contact with the back surface of the retaining ridges R1, R2, which secures the base portion 225 of the retention clip 210*e* within race 199 of the track bracket 201.

FIGS. 25-27 further illustrate how fasteners 207 are used to engage the track bracket 201 to the luminaire housing 50. As illustrated in FIGS. 25-27, the fasteners 207 extend through a hole in the luminaire base housing 50, and are received in threaded engagement to the track 201.

FIGS. 28-31 illustrate an even further embodiment of a retention clip assembly 210*f* for use with the track bracket 201 (e.g., the track bracket 201 depicted in FIG. 7). The retention clip assembly 210*f* illustrated in FIG. 28 includes a torsion spring 205, a holder plate 230, a holder boss 212 and a holder boss fastener 213. The torsion spring 205 has been described above with reference to the embodiment that is depicted in FIGS. 12-15.

Figure 28:
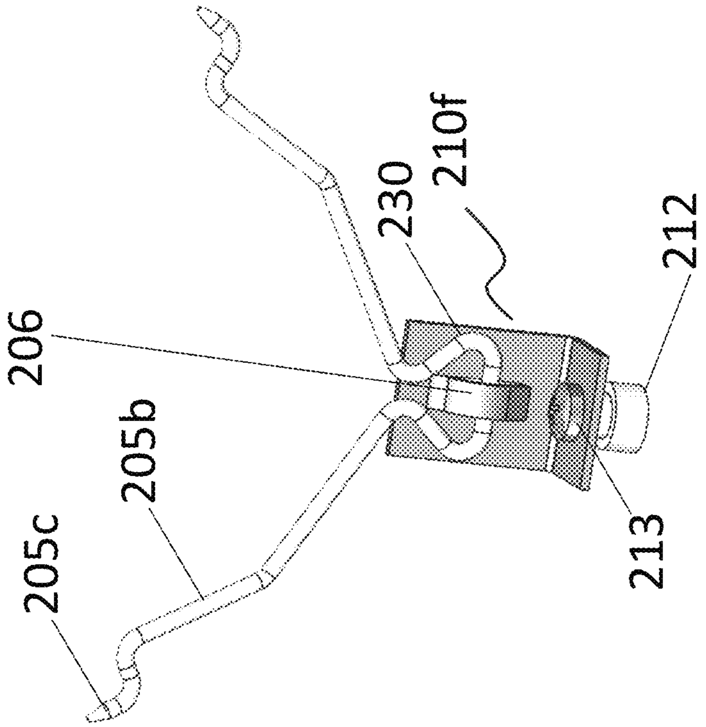
FIG. 28 is a perspective view that illustrates a retention clip assembly for use with the track bracket, in which the retention clip assembly includes a torsion spring, a holder plate, a holder boss and a holder boss fastener.

The holder plate 230 depicted in FIG. 28 is similar to the retention clip back 202 that is depicted in FIG. 8. For example, the holder plate 230 may include a retention loop 206 for the torsion spring 205. The retention loop 206 is an element of the vertically orientated portion of the retention clip back 202. The base of the holder plate 230 is horizontally oriented, and includes an opening for engagement by the holder boss fastener 213. The holder boss fastener 213 extends through the opening of the base of the holder plate into engagement with holder boss 212, in which the holder boss 212 and the head of the holder boss fastener 213 are on opposing sides of the base of the holder plate 230. The holder boss 212 engages the retaining ridges R1, R2 of the track bracket while being positioned within the race 199. The holder plate 230 may be composed of a metal, such as steel or aluminum. For example, the holder plate 230 of the retention clip assembly 210*f* may be formed from sheet metal and stamped. The retention back clip 202 when viewed from a side view can have an L-shaped cross-section.

The holder boss 212 and holder boss fastener 213 that are depicted in FIG. 28 are similar to the holder boss 212 and the holder boss fastener 213 that is illustrated in FIGS. 20-23. In accordance with some embodiments, the description of the holder boss 212 and the holder fastener 213 for these elements depicted in FIGS. 20-23 is suitable for describing these similar elements having similar reference numbers in FIGS. 28-31.

Figure 29:
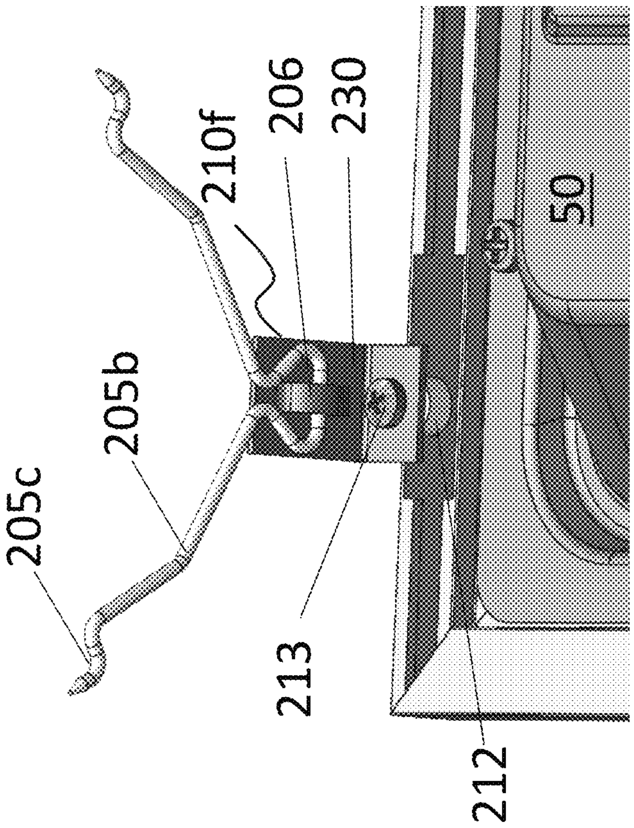
FIG. 29 is a perspective view that illustrates the retention clip assembly that is illustrated in FIG. 28 in a pre-installed position proximate to the insertion opening of the track.
Figure 30:
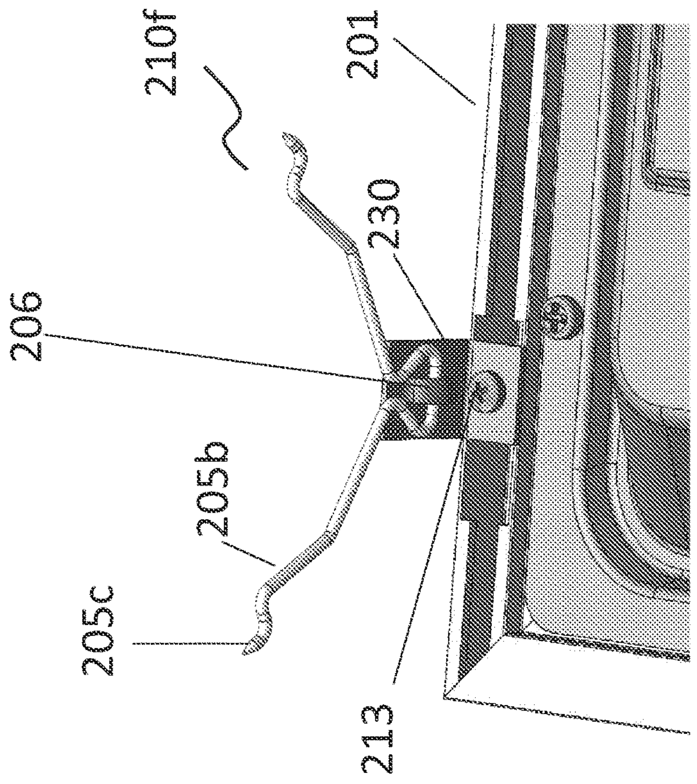
FIG. 30 is a perspective view that illustrates the initial insertion of the retention clip assembly depicted in FIG. 28 into the insertion opening of the track bracket to the race of the track that is defined between the ridges.

FIG. 29 illustrates the retention clip assembly 210*f* that is illustrated in FIG. 28 in a pre-installed position proximate to the insertion opening 216 of the track 201. FIG. 30 illustrates the initial insertion of the retention clip assembly 210*f* into the insertion opening 216 of the track bracket 201 to the race 199 of the track that is defined between the ridges R1, R2. At the point of installation depicted in FIG. 29, the holder boss fastener 213 has not been driven to provide for clearance between the holder boss and the retaining ridges R1, R2 so that the retaining clip assembly 210*f* can be slid along the race 199 until in a position at which the retaining clip assembly 210*f* can be fixed for further installation of the retrofit of the light emitting diode (LED) luminaire to the fluorescent base housing 300.

Figure 31:
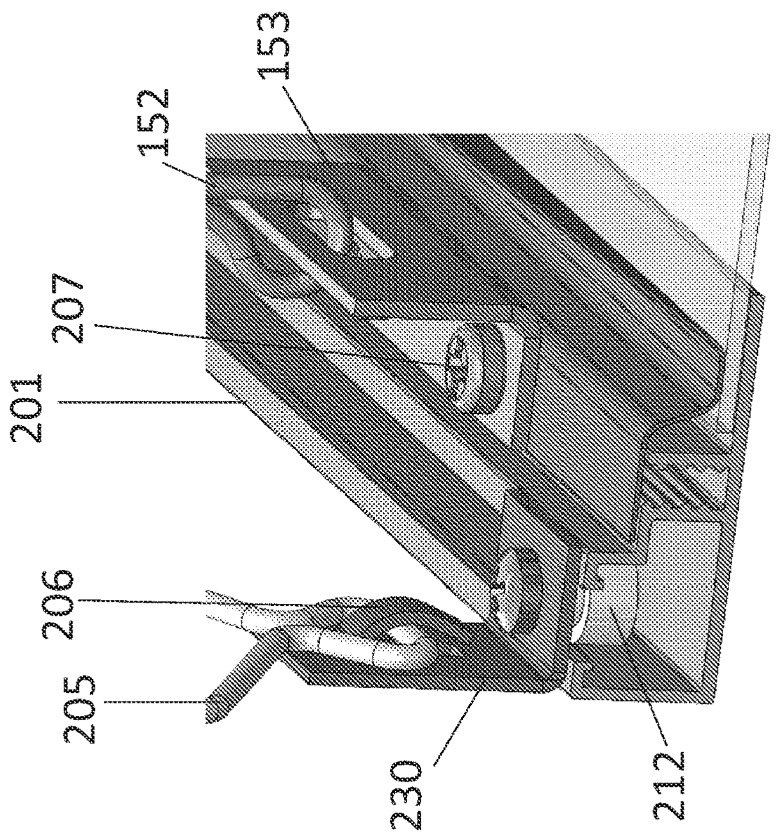
FIG. 31 is a perspective view that illustrates the retention clip assembly depicted in FIG. 28 being traversed from the position in the track bracket including the insertion opening to a portion of the track bracket at which the race includes the retaining ridges.

FIG. 31 illustrates the retention clip assembly 210*f* being traversed from the position in the track bracket 201 including the insertion opening 216 to a portion of the track bracket 201 at which the race 199 includes the retaining ridges R1, R2. The torsion spring 205 is present on a first side of the retaining ridges R1, R2 that is exterior to the track 199. The head of the holder boss fastener 213 is also present on the first side of the retaining ridges R1, R2 that is exterior to the track 199. The threaded portion of the boss fastener 213 (as well as at least a portion of the shank portion (when present)) of the boss fastener 213) are present extending through the opening separating the retaining ridges R1, R2. The tip of the boss fastener 213, as well as the holder boss 212 are present within the race 199. In some embodiments, when the drive of the retaining fastener 213 is torqued, i.e., driven, the boss fastener 213 threads into the holder boss 212, which brings the head of the holder boss 212 into contact with the back surface of the retaining ridges, and secures the retention clip assembly 210*f* into place at a fixed position to the track bracket 201.

FIGS. 29-31 further illustrate how fasteners 207 are used to engage the track bracket 201 to the luminaire housing 50. As illustrated in FIGS. 29-30, the fasteners 207 extend through a hole in the luminaire base housing 50, and are received in threaded engagement to the track 201.

Figure 32:
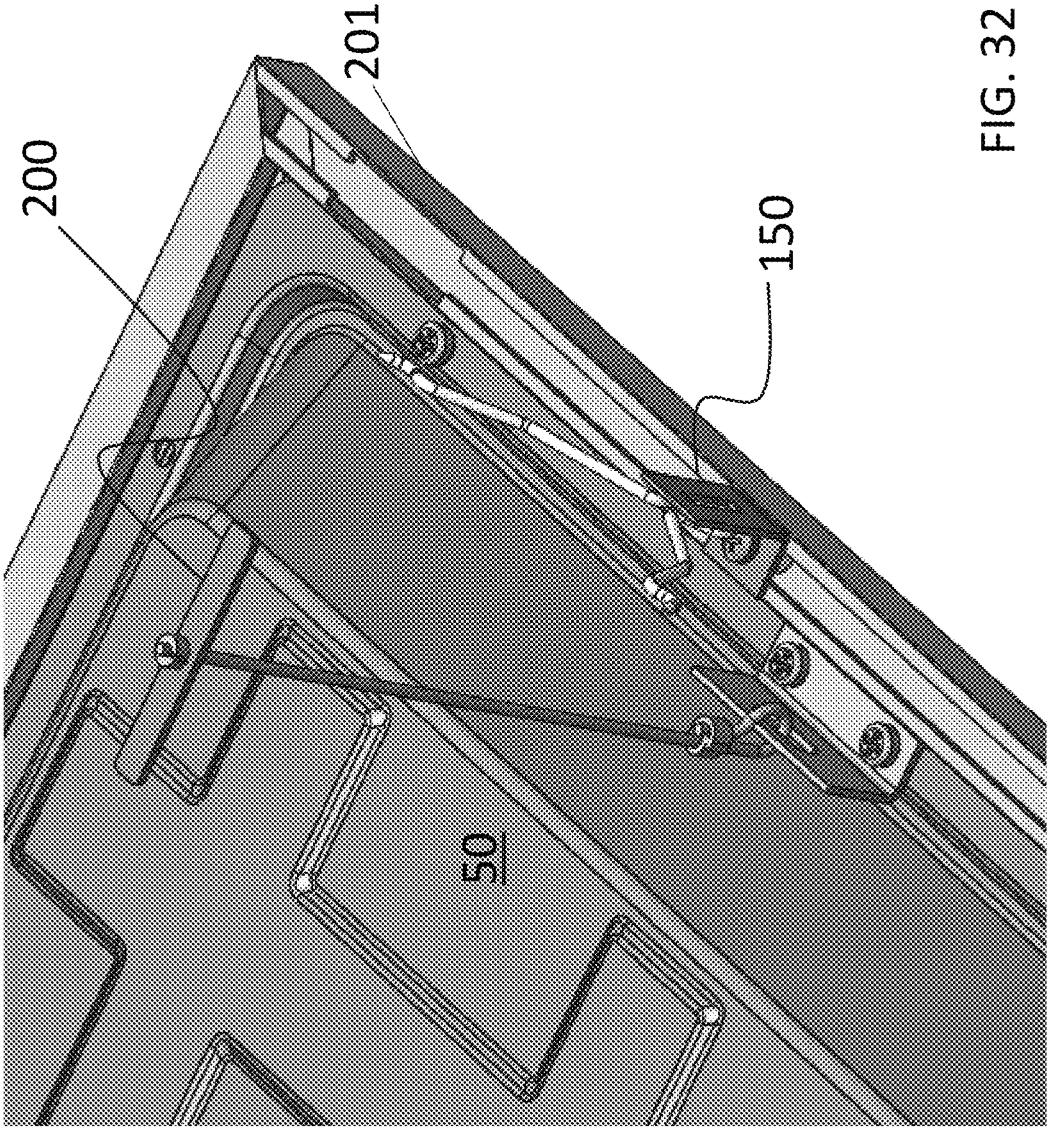
FIG. 32 is a perspective view illustrating the retention clip assembly that is depicted in FIGS. 29-30, in which the retaining clip assembly provides a retaining mechanism for the luminaire retrofit being integrated with an assembly mechanism for the luminaire retrofit panel.

FIG. 32 illustrates the embodiment of the retention clip assembly 210*f* that is depicted in FIGS. 29-30 that provides a retaining mechanism 200 for the luminaire retrofit being integrated with an assembly mechanism 150 for the luminaire retrofit. It is noted that any of the retaining clip assemblies 210*a*, 210*b*, 210*c*, 210*d* and retaining clips 210*e* described herein may be substituted for the retaining clip assembly 210*f* that is depicted in FIG. 32.

While the retaining mechanism 200 and the assembly mechanism 150 may be employed with retrofit installation of LED light panels into an existing ceiling-mounted fluorescent light fixtures, the inventive retrofit panel and anchor/hanging system has application in potentially any type of light fixture. In some embodiments, the retrofit panel 50 may have a lens, screen, diffuser, LED panel, or other insert used in the openings of similar ceiling-mounted light fixtures.

In some embodiments, the electronics of representative LED light panel 50 discussed are described in US Patent Application Publication Nos. 2013/0033861 and 2015/0023010. However, the present disclosure is not intended to be limited by these examples, as the methods and structures are directed to the installation of LED light panels 50 in retrofit applications, e.g., installation into existing ceiling-mounted fluorescent light fixtures, and is not to be limited by the different electrical implementations. In some examples, the LED light panel 50 generally has a border frame that encloses a sheet of LED sources disposed behind a light diffusing lens. A "light-emitting diode (LED)" is a semiconductor device that emits light when current flows through it. Some examples of LED light emitters that are suitable for the methods and structures described herein include inorganic semiconductor light-emitting diodes (LEDs), organic light-emitting diodes (OLED), polymer light-emitting diodes (PLED) or combinations thereof. Although the following description describes an embodiment in which the solid-state light emitters are provided by light emitting diodes, any of the aforementioned solid-state light emitters may be substituted for the LEDs. In some embodiments, the LEDs of the luminaire are selected to be capable of being adjusted for the color of the light they emit. The term "color" denotes a phenomenon of light or visual perception that can enable one to differentiate objects. Color may describe an aspect of the appearance of objects and light sources in terms of hue, brightness, and saturation. Some examples of colors that may be suitable for use with the methods and structures described herein can include red (R), orange (O), yellow (Y), green (G), blue (B), indigo (I), violet (V) and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

The LEDs of the retrofit LED light panels 50 may also be selected to allow for adjusting the "color correlated temperature (CCT)" of the light they emit. The color temperature of a light source is the temperature of an ideal black-body radiator that radiates light of a color comparable to that of the light source. Color correlated temperature is a characteristic of visible light that has applications in lighting, photography, videography, publishing, manufacturing, astrophysics, horticulture, and other fields. Color correlated temperature is meaningful for light sources that do in fact correspond somewhat closely to the radiation of some black body, i.e., those on a line from reddish/orange via yellow and more or less white to blueish white. Color correlated temperature is conventionally expressed in kelvins, using the symbol K, a unit of measure for absolute temperature. Color correlated temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs of the luminaires provided by the present disclosure in some embodiments can range from 2000K to 6500K.

The retrofit LED light panels 50 also include a driver or similar control mechanism that is disposed within an interior of the panel opposite the lens. An electrical source is connected to the driver to power the LED light panel. The electrical source may be switched or otherwise adjustable.

In some comparative light panels, the border frame is sized and configured to occupy the same space in a ceiling as the housing on a prior art ceiling-mounted light fixture. This would typically be the frame in a drop tile or hard lid ceiling, but may also be an opening in a drywall or stucco ceiling.

In contrast, in some embodiments of the luminaire retrofit assemblies of the present disclosure, the LED light panel 50 can be configured to fit within the opening of the housing 300 of an existing ceiling-mounted light fixture, such as the pre-installed fluorescent base housing 300 that is depicted in FIGS. 5 and 6. In some embodiments, the border frame 12 is configured and sized so that the LED light panel 50 sits flush with the housing 300 as would the lens of the existing ceiling-mounted light fixture. This resizing and reconfiguring of the border frame 12 makes the LED light panel 50 have a slightly smaller dimension than typical prior art LED light panels intended to replace standard 2×4 fluorescent light fixtures. Because the retrofit LED light panel 50 occupies the same space as the lens of the existing ceiling-mounted light fixture, minimal removal of components is required as described more fully below.

As shown in FIG. 1, the back-side of the border frame 12 includes provisions to mount the track bracket 201 that has been described with reference to FIG. 7. The fasteners 207 for mounting the track bracket 201 to the border frame 12 of the LED light panel 50 can also provide for fastening the assembly mechanism 150 to the LED light panel 50, as depicted in FIGS. 1, 2, 4, 15, 19, 31 and 32. In some embodiments, track brackets 201 are fastened to two sides of the border frame 12 of the LED light panel 50. In some embodiments, this provides two tracks having a race 199 that provide for engagement of the retaining mechanism 200 (the retaining mechanism 200 being provided by any of the retaining clip assemblies 210*a*, 210*b*, 210*c*, 210*d*, 210*f* and retaining clips 210*e* of the present disclosure). The race 199 allows for the retaining mechanism 200 to be adjusted within the tracks, e.g., to correspond in location to the slot, so that the retaining mechanism 200 can be engaged to the slot 302 of the fluorescent base housing 300 providing that the luminaire retrofit is seated in installation to the fluorescent base housing 300.

In some embodiments, the track bracket 201 that includes the race 199 for the retaining mechanism 200 (the retaining mechanism 200 being provided by any of the retaining clip assemblies 210*a*, 210*b*, 210*c*, 210*d*, 210*f* and retaining clips 210*e* of the present disclosure) has a generally U-shaped cross-section with ridges R1, R2 partially enclosing the top of the U-shape all the way around the perimeter. One or more cut-outs, i.e., installation openings 216, in the track are present to permit insertion of the retaining mechanism 200 (the retaining mechanism 200 being provided by any of the retaining clip assemblies 210*a*, 210*b*, 210*c*, 210*d*, 210*f* and retaining clips 210*e* of the present disclosure) into the race 199 of the track bracket 201.

As illustrated in FIG. 1, the track bracket 201 may be configured to accept one or more of the retaining mechanism 200. The retaining mechanism 200 include torsion springs 205 that extend from the opening between the ridges R1, R2 of the track bracket 201. The torsion springs 205 engage the slots 302 of the fluorescent base housing 300 providing that the luminaire retrofit is seated in installation to the fluorescent base housing 300.

As noted above, the retaining mechanisms 200 are retaining clip assemblies 210*a*, 210*b*, 210*c*, 210*d*, 210*f* or retaining clips 210*e*, that include a portion for engaging the back surfaces of the ridges R1, R2. For example, the retaining clip assemblies 210*a*, 210*b*, 210*c*, 210*d*, 210*f* include at least one of an outer retention tab 204, two inner tabs 203, retaining tabs 208, sliding retaining tabs 211 and/or holder boss 212 for engaging the ridges R1, R2; or the retention clip 210*e* includes a base 225 formed of spring wire with a width for being positioned in the race 199 and engaging the retaining ridges R1, R2. Once inserted into the race 199, the retaining clip assemblies 210*a*, 210*b*, 210*c*, 210*d*, 210*f* or the retention clip 210*e* should slide freely within the race 199 such that the retaining mechanisms 200 is adjustable in its position around the perimeter of the track.

Referring to FIGS. 1, 3 and 4, the assembly mechanism structure 150 is one of the design features for the luminaire retrofit kit that provides key design features for easy and quick installation. The assembly mechanism structure 150 includes a rod 151, a tether cable 152 and a housing bracket 153. retaining clip assemblies 210*a*, 210*b*, 210*c*, 210*d*, 210*f* or the retention clip 210*e*

As noted, the bracket 153 is engaged to the LED light panel 50 using fasteners, and may be installed at the factory. In some embodiments, the positioning of the bracket 153 is preselected to correspond to the openings 301 of a previously installed housing 300, i.e., fluorescent base housing 300. For example, when installing the LED light panel 50 in an existing ceiling-mounted light fixture, the rod 151 is designed to pivot and pass through the opening 301 in the housing 300. The sizing of the rod 151 is selected to allow for it to fit into the opening 301 in the housing 300, and is sized to permit the rod 151 to pass through the opening 301 when pivoted, but be retained by the geometry of the opening 301 when the rod 151 is oriented to transverse the opening 301. The opening 301 may be a pre-existing hole in the housing 300, or may the opening 301 may be specially drilled by the installer to accept the assembly mechanism structure 150.

When inserted into the opening in the fluorescent base housing 300 of an existing ceiling-mounted light fixture, the assembly mechanism structure 150 secures at least a portion of the LED light panel 50 at a maximum distance from the fluorescent base housing 300 to the length of the tether cable 152.

In some embodiments, the LED light panel 50 has at least two assembly mechanisms 150 spaced equally spaced around the perimeter of the border frame so as to support the entire LED light panel 50. Most preferably, assuming a rectangular or square panel, the LED light panel 50 has four assembly mechanisms 150 positioned proximate to separate corners of the border frame so as to fully support and balance the LED light panel 50 relative to the housing 300. The positioning of the assembly mechanism 150 are to support the LED light panel 50 in a pre-installed position that allows for manipulation of the LED light panel 50, as well as the associated retaining mechanisms 200 so that the LED light panel 50 can be configured for final installation by being secured to the fluorescent base housing 300 by engagement of the torsion springs 205 to the slots 302 in the fluorescent base housing 300.

In some embodiments, once the assembly mechanism 150 are connected to the fluorescent base housing 300, the installer may then connect the retaining mechanisms 200 to the fluorescent base housing 300. The retaining mechanisms 200 are configured to engage a slot 302 in the fluorescent base housing 300. In some embodiments, the installer pinches the torsion springs 205 to compress the springs 205, e.g., compress the spring arms 205*b*, wherein the compressed spring arms 205*b* have a width dimension that will fit through the slot 302. Once the compressed torsion springs 205, e.g., torsion spring arms 205*b*, are through the slot 302, the force compressing the torsion springs 205 is released, and the torsion spring arms 205*b* decompress and spring back to their originally width, at which point the torsion spring arms 205*b* engage the edges of the slot opening 302 to secure the light panel 50 to the fluorescent base housing 300. In some embodiments, when the torsion spring arms 205*b* of the retaining mechanisms 200 are fully seated into the slots 302 of the fluorescent base housing 300, the LED panel 50 may be fully seated to the fluorescent base housing 300.

In one embodiment, the LED light panel 50 may be secured to the fluorescent base housing 300 using at least two retaining mechanisms 200 spaced equally spaced around the perimeter of the LED light panel 50, so as to support the entire LED light panel. In one example, assuming a rectangular or square panel, the LED light panel 50 has four retaining mechanisms 200 positioned proximate to separate corners of the border of the LED light panel 50 so as to fully support and balance the LED light panel 50 relative to the fluorescent base housing 300.

After the assembly mechanism 150 are connected to the fluorescent base housing 300 and either after the retaining mechanisms 200 are connected to the fluorescent base housing 300, an installer may connect electrical power (not shown) to the electrical components of the LED light panel 50, e.g., the driver of the LED light panel 50.

The assembly mechanism 150 help the LED light panel 50 to hang a pre-determined installation distance from the fluorescent base housing 300. This pre-determined installation distance is such that an installer can reach into the space to connect the electrical service. Once the electrical service is connected and tested to confirm that the LED light panel 50 operates, the installer simply pushes the LED light panel 50 upward against the fluorescent base housing 300, at which point the retaining mechanisms 200 can fully engage the slots 302 via the torsion springs 205.

For example, as the arms 205*b* for the torsion springs 205 of the retaining mechanisms move further through the slot 302, the spring action of the relaxing torsion spring 205 forces the arms 205*b* outward from their previously compressed, e.g., pinched, position. This outward movement of the arms 205*b* of the torsion spring 205 from the pinched position toward an extended position levers the arms 205*b* against an inner edge of the slot 302 and acts to draw the LED light panel 50 closer to the fluorescent base housing 300 and hold it there.

Preferably, the LED light panel 50 engages the fluorescent base housing 300 closely enough so that the 205*b* a reach their fully extended position or a substantially fully extended position. Once the arms 205*b* reach this extended position, the LED light panel 10 will be fully engaged with the housing 300 and be flush with the edge of the housing 300. It could also be flush with the ceiling if the housing is recessed.

To access and/or remove the LED light panel 50, one simply needs to pull down on the edge of the border frame of the LED light panel 50 with sufficient force to pull the torsion springs 205 of the retaining mechanisms 200 back through the slots 302 of the fluorescent base housing 300. The inner edges of the slots 302 will pinch the arms 205*b* of the torsion springs 205 for the retaining mechanisms 200 together against the spring force as the LED light panel 50 is pulled away from the housing 18. Referring to FIGS. 2, 8, 12, 16, 17, 18, 20, 21, 22, 24, 25, 26, 27, 28, 29, 30, and 31, the retaining mechanisms 200 are retaining clip assemblies 210*a*, 210*b*, 210*c*, 210*d*, 210*f* or retaining clips 210*e* including torsion springs 200 having hooks 205*c* present at their ends. The hooks 205*c* can catch the inner edges of the slot openings 302 and hold the LED light panel 50 in the retracted position. If the hooks 205*c* fail to catch the edge of the slot 302 during the retraction process or if the retention mechanisms 200 fail for any reason, the assembly mechanisms 150 provide a failsafe against the LED light panel 50 falling out of the fluorescent base housing 300.

One particular advantage of the inventive LED light panel 50 is that it is easily retrofitted into existing ceiling-mounted light fixtures, e.g., pre-installed fluorescent base housings 300. To install the retrofit LED light panel 50 into an existing ceiling-mounted light fixture, such as a standard 2×4 fluorescent light fixture, one need only remove the lens and/or the fluorescent lamps from the existing fixture. The LED light panel 50 occupies the same space as the lens in an existing fluorescent light fixture. The LED light panel 50 has a low profile such that none of the other components need to be removed from the existing fixture. For safety purposes and so that they do not break, the fluorescent bulbs should also be removed, but it is not necessary when installing the LED light panel 50.

In some embodiments, the LED light panel 50 is an entire retrofit package including all electronics needed connecting the LED light panel 50 to the local power source. However, in some embodiments, the ballasts and connection plugs for the old bulbs from the fluorescent light fixture can be left in the fluorescent base housing 300 for use with the newly installed LED light panel 50. This minimizes the demolition or deconstruction to needs to be done when installing an LED light panel 50. The LED light panel 50 can be sized to fit other sizes of existing fixtures 1×4, 2×2, 2×4, etc.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. Having described preferred embodiments of LUMINAIRE RETROFIT KIT, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A retrofit light emitting diode structure comprising:

a light emitting diode (LED) panel including at least a light emitting diode (LED) light source contained within an assembly of a lens and base housing;

at least one track bracket is present on at least a portion of the perimeter of the base housing, wherein the track bracket includes an opening to a race;

an assembly mechanism is fastened to the track bracket that is positioned for engagement to an opening in a housing mount for the LED panel, wherein the assembly mechanism includes a tether having a length for providing an assembly distance from the housing mount; and a retaining mechanism including a base having a profile for engagement to the race of the track bracket and retaining arms that extend through the opening to the race for engagement to slots in the housing mount for the LED panel.

2. The retrofit light emitting diode structure of claim 1, wherein the assembly of the lens and the base housing includes a light engine of light emitting diodes and driver electronics.

3. The retrofit light emitting diode structure of claim 1, wherein the track bracket has a constant profile along its length.

4. The retrofit light emitting diode structure of claim 1, wherein a width of the opening to the race is determined by retaining ridges.

5. The retrofit light emitting diode structure of claim 1, wherein the track bracket is an extrusion comprised of aluminum or steel.

6. The retrofit light emitting diode structure of claim 1, wherein the track bracket includes an insertion opening to the race having a greater width than the opening to the race having the width defined by the ridges.

7. The retrofit light emitting diode structure of claim 1, wherein the assembly mechanism includes a bracket for engagement to the track bracket by fasteners, a tether and a rod, wherein the bracket of the assembly mechanism and the rod of the assembly mechanism are at opposing ends of the tether.

8. The retrofit light emitting diode structure of claim 7, wherein the tether is a cable.

9. The retrofit light emitting diode structure of claim 7, wherein the rod engages the opening in the housing mount for the LED panel.

10. The retrofit light emitting diode structure of claim 6, wherein retaining arms of the retention mechanism are composed of a torsion spring having a V-shaped geometry.

11. The retrofit light emitting diode structure of claim 10, wherein the torsion spring is composed of wire geometry spring or flat spring material.

12. The retrofit light emitting diode structure of claim 4, wherein the retaining arms of the retention mechanism include a hook at the end of at least one of the retaining arms.

13. The retrofit light emitting diode structure of claim 4, wherein retention mechanism is a retention clip assembly including a plurality of retaining tabs for fitment into the race, wherein the plurality of retaining tabs reversibly engage the retaining ridges of the track bracket.

14. The retrofit light emitting diode structure of claim 13, wherein the retention clip assembly includes inner retaining tabs for being positioned within the race and engaging an inner surface of at least one of the retaining ridges and the retention clip assembly includes an outer retaining tab for engaging the outer surface of the at least one of the retaining ridges.

15. The retrofit light emitting diode structure of claim 13, wherein the retaining ridges include two retaining ridges on opposing sides to the opening to the race, and the retention clip assembly includes at least one inner retaining tab for contacting each of the at least two retaining ridges.

16. The retrofit light emitting diode structure of claim 6, wherein the retention mechanism is a retention clip assembly including sliding retaining tabs having a geometry for fitment into the race, wherein the sliding retaining tabs have a width that allows for passage through the insertion opening to the race, and the width of the sliding retaining tabs fits within the race but is obstructed from being removed from the race by the retaining ridges.

17. The retrofit light emitting diode structure of claim 6, wherein the retention mechanism is a retention clip assembly that includes a holder boss and a holder boss fastener, wherein the holder boss has a width that allows for passage through the insertion opening to the race, and the width of the holder boss fits within the race but is obstructed from being removed from the race by the retaining ridges.

18. The retrofit light emitting diode structure of claim 4, wherein retention mechanism is a torsion spring having a geometry of a retention clip, in which the retention clip includes a base comprised of a first portion of the torsion spring for engaging the retaining ridges of the track bracket, and retaining arms comprised of a second portion of the torsion spring extending from the base to provide a V-shaped geometry.

19. The retrofit light emitting diode structure of claim 1, wherein the housing mount is a fluorescent base housing.

20. The retrofit light emitting diode structure of claim 1, wherein the base housing of the LED panel, the bracket of the assembly mechanism and the track bracket are affixed to one another through fasteners.

* * * * *